US012487550B2

(12) United States Patent
Shibata et al.

(10) Patent No.: US 12,487,550 B2
(45) Date of Patent: Dec. 2, 2025

(54) IMAGE FORMING METHOD AND IMAGE FORMING SYSTEM

(71) Applicant: Konica Minolta, Inc., Tokyo (JP)

(72) Inventors: Koji Shibata, Hachioji (JP); Michiaki Ishikawa, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/625,933

(22) Filed: Apr. 3, 2024

(65) Prior Publication Data

US 2024/0353785 A1 Oct. 24, 2024

(30) Foreign Application Priority Data

Apr. 18, 2023 (JP) ................................. 2023-067717

(51) Int. Cl.

| | |
|---|---|
| ***G03G 15/00*** | (2006.01) |
| ***G03G 9/00*** | (2006.01) |
| ***G03G 9/087*** | (2006.01) |
| ***G03G 15/09*** | (2006.01) |

(52) U.S. Cl.

CPC ....... *G03G 15/751* (2013.01); *G03G 9/08755* (2013.01); *G03G 15/09* (2013.01); *G03G 2215/0604* (2013.01)

(58) Field of Classification Search

CPC .. G03G 15/09; G03G 15/751; G03G 9/08755; G03G 2215/0604

See application file for complete search history.

(56) References Cited

U.S. PATENT DOCUMENTS

| | | | | |
|---|---|---|---|---|
| 2024/0160120 | A1* | 5/2024 | Ishida | G03G 5/047 |
| 2024/0302769 | A1* | 9/2024 | Oura | G03G 15/1605 |
| 2024/0353777 | A1* | 10/2024 | Ishikawa | G03G 15/0818 |

FOREIGN PATENT DOCUMENTS

| | | |
|---|---|---|
| JP | 2022-189247 A | 12/2022 |

* cited by examiner

*Primary Examiner* — Sophia S Chen

(74) *Attorney, Agent, or Firm* — LUCAS & MERCANTI, LLP

(57) ABSTRACT

An image forming method uses a photoreceptor including at least an aluminum substrate, a toner for developing an electrostatic image including toner particles containing at least a binding resin, and a developer bearing member including a member that generates a magnetic flux inside, wherein the aluminum substrate contains silicon, a silicon content of the aluminum substrate is more than 0.6% by mass, and a glass transition point (Tg) of the toner for developing an electrostatic image is in a range of 0 to 45° C.

4 Claims, 3 Drawing Sheets

IMAGE FORMING METHOD AND IMAGE FORMING SYSTEM

CROSS REFERENCE TO RELATED APPLICATIONS

The entire disclosure of Japanese Patent Application No. 2023-067717, filed on Apr. 18, 2023, including description, claims, drawings and abstract is incorporated herein by reference in its entirety.

BACKGROUND OF THE INVENTION

Technical Field

The present invention relates to an image forming method and an image forming system. In particular, the present invention relates to an image forming method and an image forming system that can achieve both low-temperature fixability and transferability.

Description of Related Art

With improvement in performance of an image forming apparatus using an electrophotographic method, images having relatively high image quality have been obtained. Thus, image forming apparatuses using an electrophotographic method have been widely used in the field of quick printing in which a relatively small number of prints is obtained. As a result, image forming apparatuses using an electrophotographic method have been required to have a higher level of image quality. In addition, image forming apparatuses using an electrophotographic method have become to be used for conventionally rare applications. For example, image forming apparatuses using an electrophotographic method are used for printing on coated paper, printing of a high-coverage image, printing of an extremely high-definition image or an image having a delicate tone (color tone), mass continuous printing of the same image, and the like.

On the other hand, from the viewpoint of reducing an environmental load, low-temperature fixing has been conventionally studied in order to reduce power consumption. For example, JP 2022-189247A discloses regulating the molecular weight corresponding to the top of the main peak of the molecular weight distribution curve of the constituent components of the toner and the peak area ratio of the amorphous material of the low molecular weight components in the molecular weight distribution curve within a certain range.

However, it has been found that as the low-temperature fixing proceeds, the transferability deteriorates, so that it is difficult to achieve both the low-temperature fixing and the transferability.

SUMMARY OF THE INVENTION

The present invention has been made in consideration of the above-described problems and circumstances, and an object of the present invention is to provide an image forming method and an image forming system capable of achieving both low-temperature fixability and transferability.

To achieve the object, the present inventors have studied the causes of the above problems and the like. As a result, the present inventors have found that both low-temperature fixability and transferability can be achieved by setting the silicon content of the aluminum substrate used in a photoreceptor and the glass transition point of a toner for developing an electrostatic image to specific ranges.

That is, the abovementioned object of the present invention is achieved by the following configurations.

To achieve at least one of the abovementioned objects, according to an aspect of the present invention, an image forming method reflecting one aspect of the present invention is provided:

An image forming method using a photoreceptor including at least an aluminum substrate, a toner for developing an electrostatic image including toner particles containing at least a binding resin, and a developer bearing member including a member that generates a magnetic flux inside, wherein

- the aluminum substrate contains silicon,
- a silicon content of the aluminum substrate is more than 0.6% by mass, and
- a glass transition point (Tg) of the toner for developing an electrostatic image is in a range of 0 to 45° C.

To achieve at least one of the abovementioned objects, according to an aspect of the present invention, an image forming system reflecting one aspect of the present invention includes:

- a photoreceptor including at least an aluminum substrate;
- a means that develops a latent image formed on the photoreceptor with a toner for developing an electrostatic image;
- a means that transfers a toner image on the photoreceptor to a transfer-receiving body; and
- the toner for developing an electrostatic image, wherein the aluminum substrate contains silicon,
- a silicon content of the aluminum substrate is more than 0.6% by mass, and
- a glass transition point (Tg) of the toner for developing an electrostatic image is in a range of 0 to 45° C.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Figure 1:
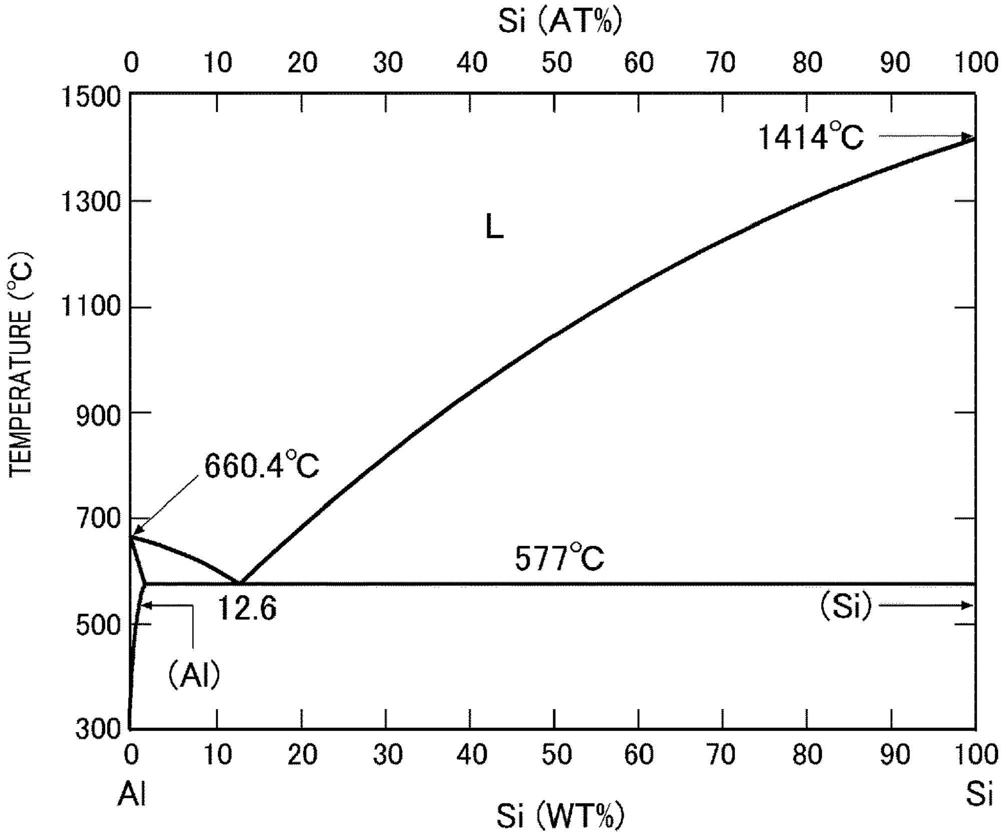
FIG. 1 is a phase diagram of an Al—Si system.

Hereinafter, one or more embodiments of the present invention will be described with reference to the drawings. However, the scope of the invention is not limited to the disclosed embodiments.

The image forming method of the present invention is an image forming method using a photoreceptor including at least an aluminum substrate, a toner for developing an electrostatic image including toner particles containing at least a binding resin, and a developer bearing member including a member that generates a magnetic flux inside, wherein the aluminum substrate contains silicon, a silicon content of the aluminum substrate is more than 0.6% by mass, and a glass transition point (Tg) of the toner for developing an electrostatic image is in a range of 0 to 45° C.

This feature is a technical feature common to or corresponding to each of the following embodiments.

As an embodiment of the present invention, it is preferable that a main component of the binding resin contained in the toner particles is polyester, from the viewpoint that a balance between the low-temperature fixability and heat resistance is easily obtained.

From the viewpoint of adhesion, since polyester is a dehydration condensation reaction system, has particularly good compatibility with paper, and also has a high internal cohesive force, the folding fixability, particularly after completion of fixing, becomes high. Thus, further low-temperature fixing can be achieved.

On the other hand, as described above, the inclusion of silicon in the aluminum substrate forms protrusions, which is advantageous for transfer in terms of adhesion to toner. However, since minute leakage occurs at the protrusions, the toner particles can be polarized at the time of transfer by containing a resin having much polarity such as polyester in the toner particles. As a result, minute leakage can be suppressed, and further improvement in transferability can be expected.

The silicon content of the aluminum substrate is preferably more than 0.6% by mass and 20% by mass or less in that the transferability becomes more satisfactory.

The image forming system of the present invention is an image forming system including: a photoreceptor including at least an aluminum substrate; a means that develops a latent image formed on the photoreceptor with a toner for developing an electrostatic image; a means that transfers a toner image on the photoreceptor to a transfer-receiving body; and the toner for developing an electrostatic image, wherein the aluminum substrate contains silicon, a silicon content of the aluminum substrate is more than 0.6% by mass, and a glass transition point (Tg) of the toner for developing an electrostatic image is in a range of 0 to 45° C.

According to this, an image forming system achieving both low-temperature fixability and transferability can be provided.

Hereinafter, the present invention and constituent elements thereof, and modes and aspects for carrying out the present invention will be described. In the present description, when two figures are used to indicate a range of value before and after "to", these figures are included in the range as a lower limit value and an upper limit value.

[Outline of Image Forming Method of Present Invention]

The image forming method of the present invention is an image forming method using a photoreceptor including at least an aluminum substrate containing silicon, a toner for developing an electrostatic image including toner particles containing at least a binding resin, and a developer bearing member including a member that generates a magnetic flux inside, wherein a silicon content of the aluminum substrate is more than 0.6% by mass, and a glass transition point (Tg) of the toner for developing an electrostatic image is in a range of 0 to 45° C.

Hereinafter, the "electrophotographic photoreceptor" is also referred to simply as a "photoreceptor".

Furthermore, the "toner for developing an electrostatic image" is also simply referred to as a "toner". The toner includes toner particles each including a toner base particle and an external additive disposed on a surface of the toner base particle.

In the present specification, the term "toner base particles" refers to a base of "toner particles". The "toner base particles" according to the present invention contains at least a binding resin, and may contain other constituent components, such as a colorant, a release agent (wax), and a charge control agent, if necessary. The "toner base particles" are referred to as "toner particles" by addition of an external additive. The term "toner" refers to an aggregate of toner particles.

The term "developer bearing member" refers to a developing roller.

<Silicon Content of Aluminum Substrate>

The aluminum substrate according to the present invention is a support for an electrophotographic photoreceptor containing an aluminum-based alloy as a main component.

The "aluminum-based alloy" refers to an alloy in which the content of aluminum (Al) is 50% by mass or more with respect to the entire alloy.

The phrase "containing an aluminum-based alloy as a main component" means that the content of the aluminum-based alloy is 95% by mass or more with respect to the entire aluminum substrate.

Furthermore, the aluminum substrate according to the present invention contains silicon (Si).

The silicon content is more than 0.6% by mass with respect to the total mass of the entire aluminum substrate. The silicon content is preferably more than 0.6% by mass and 20% by mass or less, and more preferably in a range of 0.8 to 12.6% by mass, and more preferably in a range of 1.0 to 5.0% by mass.

When the silicon content in the aluminum substrate is 0.6% by mass or less, the resistance is low and the number of protrusions derived from silicon crystals is small, thus image defects are hardly generated. However, the number of the protrusions is too small to obtain the effect of excellent transferability due to the protrusions. When the silicon content ratio is 12.6% by mass or less, since it is a eutectic system having a eutectic point of 12.6%, contaminations by coarse crystals are not occurred and thus it is preferable from the viewpoint of preventing occurrence of image defects.

The aluminum substrate may contain Fe, Cu, Mn, Mg, Ti, or the like in addition to Al and Si.

It is preferable that Fe is 0.7% by mass or less, Cu is in a range of 0.05 to 0.2% by mass, Mn is 0.9% by mass or less, and Ti, Zn, and Cr each are 0.1% by mass or less with respect to the total mass of the entire aluminum substrate.

<Glass Transition Point of Toner>

The "glass transition point" is defined as a temperature at which a free volume of molecules increases and micro Brownian motion starts as the temperature of a resin component or the like forming the toner changes from a low temperature to a high temperature. The glass transition point (Tg) is also referred to as glass transition temperature.

In order to enhance the low-temperature fixability of the toner, a design for lowering the glass transition point with which molecular motion is allowed to proceed from a lower temperature is required. It is further preferable to adopt a contrivance for the heat-resistant storage property and the suppression of toner-particle fusion.

As the contrivance, it is also preferable to adopt, for example, a core-shell type toner configuration in which the configurations are different between the surface and the inside of the toner, and a resin having a low glass transition point is used for the core and a resin having a high glass transition point is used for the shell.

Furthermore, as the contrivance, it is also preferable to harden only the surface by using a means that fixes inorganic fine particles as an external additive to the portion corresponding to the shell, thereby ensuring heat-resistant storage property and fusion aggregation resistance.

The glass transition point of the toner according to the present invention is in a range of 0 to 45° C. The glass transition point is preferably in a range of 10 to 30° C.

When the glass transition point is lower than 0° C., the toner is too soft, resulting in image failure, and when the glass transition point is higher than 45° C., the low-temperature fixability of the toner deteriorates.

It should be noted that the resin of the core constituting the toner according to the present invention is required to be designed to have a lower glass transition point, and the resin of the shell is required to be designed to have a higher glass transition point.

(Control Method)

The glass transition point of the resin is controlled by changing the type of the resin constituting the binding resin, the molecular weight of the resin, the component ratio of each resin when using a plurality of types of resins, and the like.

Specifically, it is preferable to use an amorphous polyester and a crystalline polyester in combination as the binding resin. When the amorphous polyester and the crystalline polyester are used in combination, it is preferable that the content of the amorphous polyester is in a range of 65 to 95% by mass and the content of the crystalline polyester is in a range of 5 to 35% by mass with respect to the binding resin. Alternatively, only the styrene-(meth)acrylic copolymer resin may be used as the binding resin.

(Measurement Method)

The glass transition point is determined from a DSC curve obtained by differential scanning calorimetry (DSC).

To be more specific, it is determined by the "extrapolated glass-transition starting temperature" described in the method for determining a glass transition point in JIS K-7121-1987 "Testing Methods for Transition Temperatures of Plastics". JIS stands for Japanese Industrial Standards.

This measurement is performed as follows.

First, a substance to be measured is set in a differential scanning calorimeter (apparatus name: DSC-50 type) manufactured by Shimadzu Corp. equipped with an automatic tangential processing system, and liquid nitrogen is set as a cooling medium. Next, the sample is heated from 0° C. to 150° C. at a temperature increase rate of 10° C./min (first temperature increase process), and the relationship between the temperature (° C.) and the amount of heat (mW) is obtained. Next, the sample is cooled to 0° C. at a temperature decrease rate of −10° C./min, and is heated again to 150° C. at a temperature increase rate of 10° C./min (second temperature increase process) to collect data. Note that the temperature was held at 0° C. and 150° C. for 10 minutes each.

The melting temperature of the mixture of indium and zinc was used for temperature correction of the detection portion of the measurement apparatus, and the heat of fusion of indium was used for correction of the amount of heat. The sample was placed in an aluminum pan, and the aluminum pan containing the sample and an empty aluminum pan for control were set.

The glass transition point (glass transition temperature) was defined as the temperature at the intersection of the extension lines of the base line and the rising line in the endothermic part of the DSC curve obtained in the second temperature increase process.

Hereinafter, each of the photoreceptor, the developing roller, and the toner used in the image forming method of the present invention will be described, and then the image forming system of the present invention will be described.

1. Photoreceptor

[Layer Configuration of Photoreceptor]

The photoreceptor used in the image forming method of the present invention has a configuration in which a photosensitive layer is laminated on a support. The photoreceptor preferably includes an intermediate layer between the support and the photosensitive layer.

The photosensitive layer may have a single-layer structure containing a charge generation compound and a charge transport compound. Furthermore, the photosensitive layer may have a stacked structure of a charge generation layer containing a charge generation compound and a charge transport layer containing a charge transport compound.

Furthermore, the photoreceptor according to the present invention preferably has a surface protective layer on the photosensitive layer.

The layer configuration of the photoreceptor may be, for example, as in the following (1) to (4).

Figure 2:
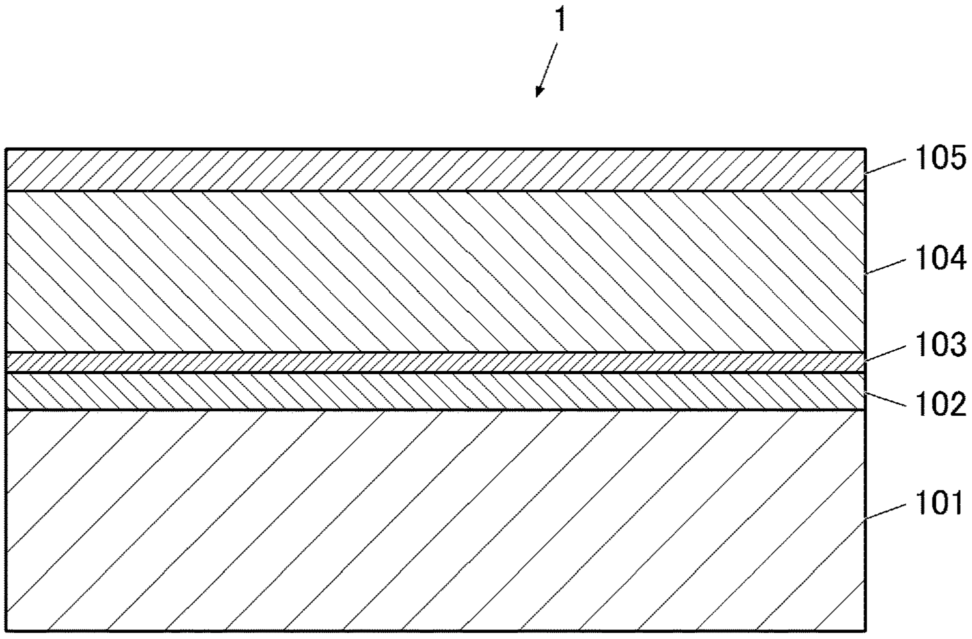
FIG. 2 is a diagram illustrating an example of a layer configuration of a photoreceptor.

(1) Support/intermediate layer/charge generation layer/charge transport layer (2) Support/intermediate layer/single-layer photosensitive layer (3) Support/intermediate layer/charge generation layer/charge transport layer/surface protective layer (4) Support/intermediate layer/single-layer photosensitive layer/surface protective layer FIG. 2 is a diagram illustrating an example of a layer configuration of a photoreceptor. In the photoreceptor 1 illustrated in FIG. 2, an intermediate layer 102, a charge generation layer 103, a charge transport layer 104, and a surface protective layer 105 are sequentially laminated on a support 101.

<Support>

The support is the aluminum substrate according to the present invention as described above. Hereinafter, the aluminum substrate is also simply referred to as a "support".

The aluminum substrate contains Si. As described above, the content of Si is more than 0.6% by mass with respect to the total mass of the aluminum substrate.

The aluminum substrate preferably has a cylindrical shape whose surface is formed of at least one of aluminum and an aluminum alloy. The surface of the aluminum substrate may be subjected to a hot water treatment, a blast treatment, a cutting treatment, or the like. Note that the cross-section of the cylindrical aluminum substrate does not include a cross-sectional shape having two or more spaces.

As a method for producing the aluminum substrate, a method in which the aluminum substrate is cut into a predetermined length after hot extrusion and cold drawing, and the surface is subjected to precision processing is generally used.

The aluminum substrate preferably has a thickness in a range of 0.5 to 5.0 mm.

<Intermediate Layer>

The photoreceptor according to the present invention preferably has an intermediate layer between the support (aluminum substrate) and the photosensitive layer. As a result, it is possible to impart a function of preventing a charge leak spot which may be generated by crystals derived from the alloy component to the photoreceptor.

The intermediate layer is, for example, a layer containing a binder resin (hereinafter, also referred to as "binder resin for intermediate layer") and, if necessary, conductive particles and metal oxide particles.

Examples of the binder resins for intermediate layer include casein, polyvinyl alcohol, nitrocellulose, ethylene-acrylic acid copolymers, polyamide resins, polyurethane resins, and gelatin. Among these, alcohol-soluble polyamide resins are preferable.

The intermediate layer may contain various conductive particles or metal oxide particles for the purpose of resistance adjustment.

As the metal oxide particles, various metal oxide particles such as alumina, zinc oxide, titanium oxide, tin oxide, antimony oxide, indium oxide, bismuth oxide, and zirconium oxide can be used. Particles of composite metal oxides such as tin-doped indium oxide and antimony-doped tin oxide may also be used.

The metal-oxide particles preferably have a number-average primary particle size of 10 to 300 nm, more preferably 20 to 100 nm.

The conductive particles or metal oxide particles may be used alone or in combination of two or more kinds thereof. When two or more kinds of the conductive particles or metal oxide particles are mixed, they may be in the form of a solid solution or a fused product.

The content of the conductive particles or metal oxide particles is preferably in a range of 20 to 400 parts by mass, and more preferably in a range of 50 to 350 parts by mass, relative to 100 parts by mass of the binder resin.

The thickness of the intermediate layer is preferably in a range of 0.1 to 15 μm, and more preferably in a range of 0.3 to 10 μm.

<Photosensitive Layer>

The photosensitive layer may have a single-layer structure containing a charge generation compound and a charge transport compound. Furthermore, the photosensitive layer may have a stacked structure of a charge generation layer containing a charge generation compound and a charge transport layer containing a charge transport compound.

(Charge Generation Layer)

The charge generation layer is a layer containing a charge generation compound and a binder resin (hereinafter, also referred to as a "binder resin for a charge generation layer").

The "charge generation compound" refers to a compound that exhibits the ability to generate a charge carrier, i.e., an electron or a hole. Examples of the charge generation compound include, but are not limited to, azo pigments such as sudan red diane blue; quinone pigments such as pyrenequinone, anthanthrone; quinocyanine pigments; perylene pigments; indigo pigments such as indigo and thioindigo; polycyclic quinone pigments such as pyranthrone, diphthaloylpyrene; and phthalocyanine pigments. Among these, polycyclic quinone pigments, titanyl phthalocyanine pigments, and gallium phthalocyanine are preferable. These charge generation compounds may be used alone or as a mixture of two or more kinds thereof.

As the binder resin for charge generation layer, a known resin can be used. Examples of the known resins include, but are not limited to, a polystyrene resin, a polyethylene resin, a polypropylene resin, an acrylic resin, a methacrylic resin, a vinyl chloride resin, a vinyl acetate resin, a polyvinyl butyral resin, an epoxy resin, a polyurethane resin, a phenol resin, polyester, an alkyd resin, a polycarbonate resin, a silicone resin, a melamine resin, and a copolymer resin containing two or more of these resins (e.g., a vinyl chloride-vinyl acetate copolymer resin, a vinyl chloride-vinyl acetate-maleic anhydride copolymer resin) and a poly-vinylcarbazole resin. Among these, a polyvinyl butyral resin is preferable.

The content of the charge generation compound in the charge generation layer is preferably in a range of 1 to 600 parts by mass, and more preferably in a range of 50 to 500 parts by mass, relative to 100 parts by mass of the binder resin for a charge generation layer.

The thickness of the charge generation layer varies depending on the properties of the charge generation compound, the properties of the binder resin for a charge generation layer, the content ratio, and the like, but is preferably in a range of 0.01 to 5 μm and more preferably in a range of 0.05 to 3 μm.

(Charge Transport Layer)

The charge transport layer is a layer containing a charge transport compound and a binder resin (hereinafter, also referred to as "binder resin for charge transport layer").

The "charge transport compound" refers to a compound that exhibits the ability to transport a charge carrier, i.e., an electron or a hole. As the charge transport compound, a known charge transport compound can be used. Examples of the known charge transport compound include carbazole derivatives, oxazole derivatives, oxadiazole derivatives, thiazole derivatives, thiadiazole derivatives, triazole derivatives, imidazole derivatives, imidazolone derivatives, imidazolidine derivatives, bisimidazolidine derivatives, styryl compounds, hydrazone compounds, pyrazoline compounds, oxazolone derivatives, benzimidazole derivatives, quinazoline derivatives, benzofuran derivatives, acridine derivatives, phenazine derivatives, aminostilbene derivatives, triarylamine derivatives, phenylenediamine derivatives, stilbene derivatives, benzidine derivatives, poly-N-vinylcarbazole, poly-1-vinylpyrene, poly-9-vinylanthracene, and triphenylamine derivatives. These may be used as a mixture of two or more kinds thereof.

Preferable examples of the charge transport compound used in the photoreceptor for short-wave exposure such as short-wave laser are shown below.

| Compound Example | Structure | Molecular Weight |
| --- | --- | --- |
| CTM-31 | 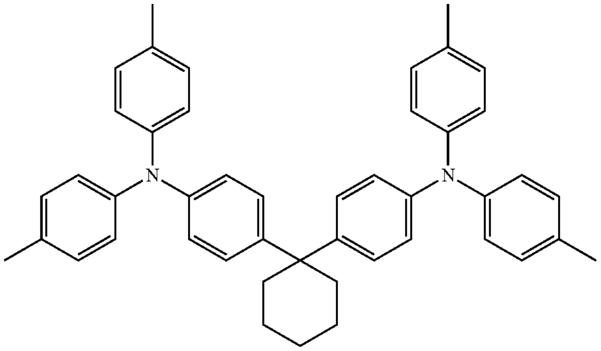 | 626.87 |

-continued
| Compound Example | Structure | Molecular Weight |
|---|---|---|
| CTM-32 | 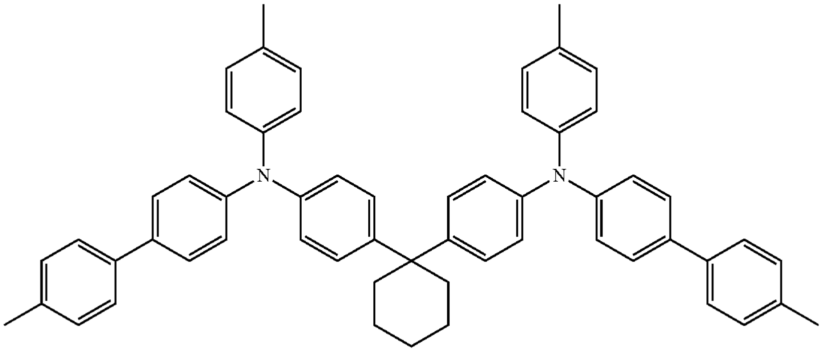 | 779.06 |
| CTM-33 | 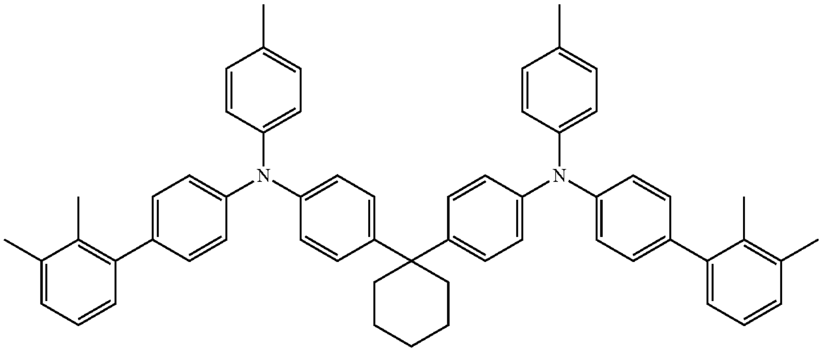 | 807.12 |
| CTM-34 | 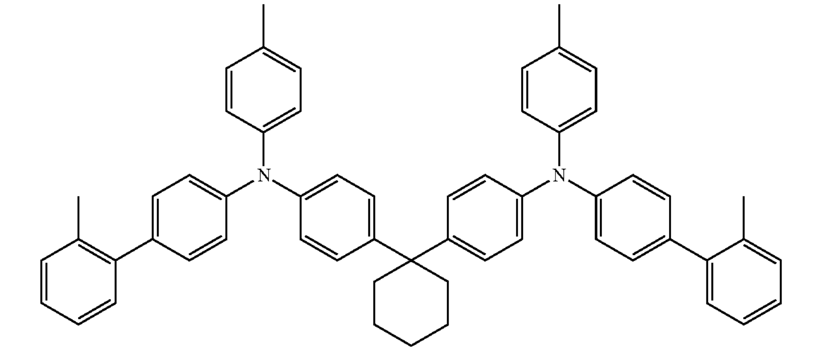 [SMILES: Cc1ccc(N(c2ccc(-c3ccccc3C)cc2)c2ccc(C3(c4ccc(N(c5ccc(C)cc5)c5ccc(-c6ccccc6C)cc5)cc4)CCCCC3)cc2)cc1] | 779.06 |
In addition, preferable examples of the charge transport compound used in a photoreceptor for long-wave exposure using a long-wave laser or the like are shown below.
| Compound Example | Structure | Molecular Weight |
|---|---|---|
| CTM-41 | 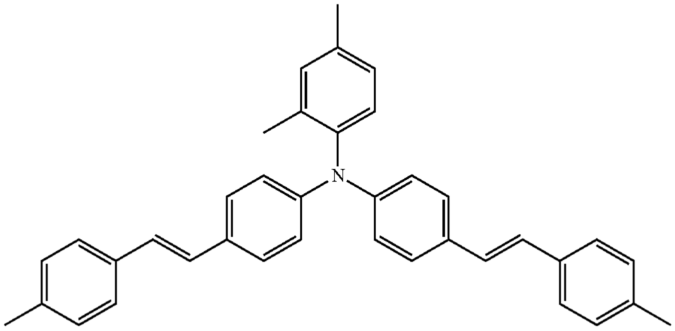 | 505.69 |

-continued
| Compound Example | Structure | Molecular Weight |
|---|---|---|
| CTM-42 | 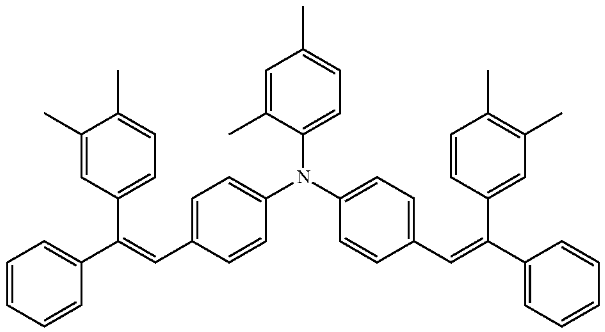 [SMILES: Cc1ccc(N(c2ccc(/C=C(/c3ccccc3)c3ccc(C)c(C)c3)cc2)c2ccc(/C=C(/c3ccccc3)c3ccc(C)c(C)c3)cc2)c(C)c1] | 685.84 |
| CTM-43 | 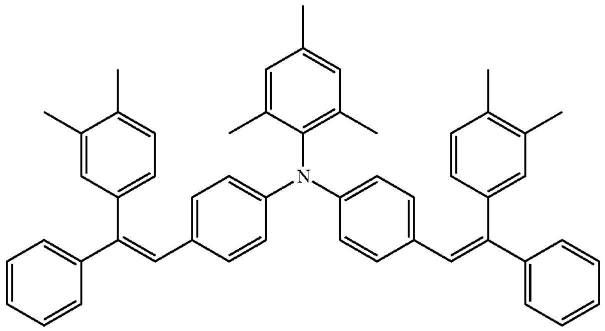 [SMILES: Cc1cc(C)c(N(c2ccc(/C=C(/c3ccccc3)c3ccc(C)c(C)c3)cc2)c2ccc(/C=C(/c3ccccc3)c3ccc(C)c(C)c3)cc2)c(C)c1] | 699.96 |
| CTM-44 | 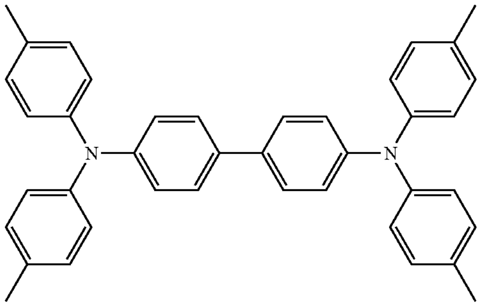 [SMILES: Cc1ccc(N(c2ccc(C)cc2)c2ccc(-c3ccc(N(c4ccc(C)cc4)c4ccc(C)cc4)cc3)cc2)cc1] | 544.73 |
| CTM-45 | 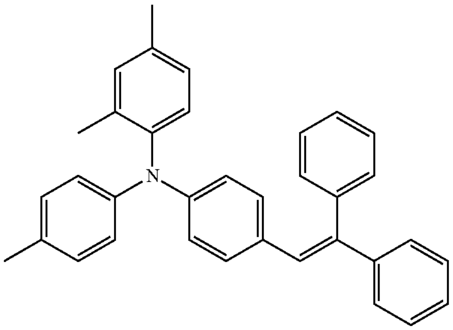 [SMILES: Cc1ccc(N(c2ccc(C=C(c3ccccc3)c3ccccc3)cc2)c2ccc(C)cc2C)cc1] | 465.63 |

-continued

| Compound Example | Structure | Molecular Weight |
| --- | --- | --- |
| CTM-46 | 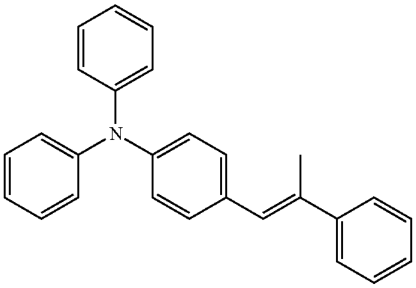 [SMILES: C/C(=C\c1ccc(N(c2ccccc2)c2ccccc2)cc1)c1ccccc1] | 361.48 |

The following compounds can also be suitably used as the charge transport compound contained in the charge transport layer.

CTM-47

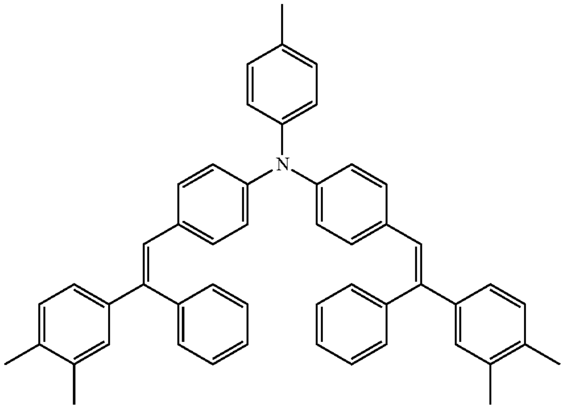

CTM-48

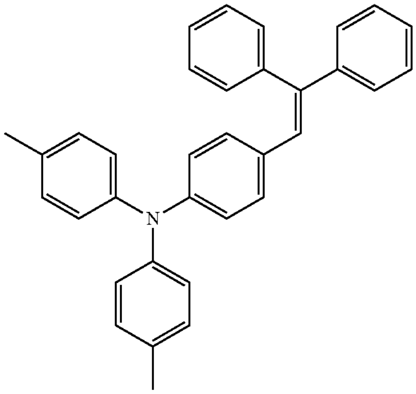

The charge transport compound can be synthesized by a known synthesis method, for example, synthesis methods described in JP 2010-26428A, JP 2010-91707A, and the like.

As the binder resin for the charge transport layer, a known resin can be used. Examples of the binder resin for charge transport include a polycarbonate resin, a polyacrylate resin, polyester, a polystyrene resin, a styrene-acrylonitrile copolymer resin, a polymethacrylate resin, and a styrene-methacrylate copolymer resin, and the polycarbonate resin is preferable. Furthermore, BPA, BPZ, dimethyl BPA, and a BPA-dimethyl BPA copolymer are preferable as the binder resin for charge transport in terms of crack resistance, abrasion resistance, and chargeability.

The content of the charge transport compound in the charge transport layer is preferably 10 to 500 parts by mass, and more preferably 20 to 250 parts by mass, relative to 100 parts by mass of the binder resin for a charge transport layer.

The charge transport layer may contain an antioxidant, an electron conductive agent, a stabilizer, silicone oil, and the like. Preferred antioxidants are those disclosed in JP 2000-305291A, and preferred electronic conductive agents are those disclosed in JP S50-137543A, JP S58-76483A, and the like.

The thickness of the charge transport layer varies depending on the characteristics of the charge transport compound, the characteristics of the binder resin, the mixing ratio, and the like, but is preferably in a range of 5 to m, more preferably in a range of 10 to 30 μm.

(Photosensitive Layer Having Single-Layer Structure)

The single-layer photosensitive layer contains a charge generation compound and a charge transport compound. The photosensitive layer may further contain components that may be contained in the charge generation layer and the charge transport layer as described above.

When the photosensitive layer has a single-layer structure, charge generation occurs mainly in the vicinity of the surface of the photosensitive layer. Thus, influences by a charge leakage spot which may be generated due to crystals derived from an alloy component of the support become less, and image failure is less likely to occur. In addition, when the photosensitive layer has a single-layer structure, there is also an advantage that the photoreceptor can be produced at low cost.

The thickness of the photosensitive layer having a single-layer structure varies depending on the characteristics of the charge generation compound, the characteristics of the charge transport compound, the characteristics of the binder resin, the mixing ratio of the components, and the like, but is preferably in a range of 5 to 40 μm, and more preferably in a range of 10 to 30 μm.

<Surface Protective Layer>

The surface protective layer is a layer containing a cured product of a composition for forming a surface protective layer.

The photoreceptor of the present invention preferably has a surface protective layer. With this, increase of the surface roughness due to long-term use can be prevented, and lowering of the cleaning performance can be suppressed.

The composition for forming a surface protective layer is a composition containing a polymerizable compound and a charge transport compound, or a composition containing a charge transport compound which itself is a polymerizable compound. The composition for forming a surface protective layer may contain a charge transport compound which itself is a polymerizable compound and another polymerizable compound.

The cured product of the composition is a cured product obtained by polymerization of the polymerizable compound in the composition to form a matrix.

The "charge transport compound" refers to a compound exhibiting a transporting property of a charge carrier, i.e., an electron or a hole. As the charge transport compound, a known charge transport compound can be used. Examples of the charge transport compound include carbazole derivatives, oxazole derivatives, oxadiazole derivatives, thiazole derivatives, thiadiazole derivatives, triazole derivatives, imidazole derivatives, imidazolone derivatives, imidazolidine derivatives, bisimidazolidine derivatives, styryl compounds, hydrazone compounds, pyrazoline compounds, oxazolone derivatives, benzimidazole derivatives, quinazoline derivatives, benzofuran derivatives, acridine derivatives, phenazine derivatives, aminostilbene derivatives, triarylamine derivatives, phenylenediamine derivatives, stilbene derivatives, benzidine derivatives, poly-N-vinylcarbazole, poly-1-vinylpyrene, poly-9-vinylanthracene, and triphenylamine derivatives. These may be used as a mixture of two or more kinds thereof.

The term "polymerizable compound" refers to a compound having a functional group capable of reacting by chain polymerization. As the functional group capable of reacting by chain polymerization, an acryloyloxy group ($CH_2$=CHCOO—) or a methacryloyloxy group ($CH_2$=C($CH_3$)COO—) is preferable.

The composition for forming a surface protective layer preferably contains a polymerization initiator.

The polymerization initiator is appropriately selected depending on the type of the polymerizable compound contained in the composition for forming a surface protective layer. The polymerization initiator may be a thermal polymerization initiator or a photopolymerization initiator, but is preferably a photopolymerization initiator. In particular, a radical polymerization initiator is preferable.

The radical polymerization initiator is not particularly limited and a known radical polymerization initiator can be used, and examples thereof include alkylphenone compounds and phosphine oxide compounds. Among these, a compound having an α-aminoalkylphenone structure or an acylphosphine oxide structure is preferable, and a compound having an acylphosphine oxide structure is more preferable. Examples of the compound having an acylphosphineoxide structure include Omnirad819 (bis(2,4,6-trimethylbenzoyl) phenylphosphineoxide, manufactured by IGM Resins B.V.). The polymerization initiators may be used alone or in combination of two or more kinds thereof.

The composition for forming a surface protective layer may further contain a solvent, inorganic fine particles, lubricating organic fine particles, an antioxidant, a stabilizer, a silicone oil, and the like.

The thickness of the surface protective layer is preferably 0.2 to 10 μm, more preferably 0.5 to 6 μm.

[Method for Producing Photoreceptor]

The photoreceptor can be produced, for example, by sequentially forming each layer constituting the photoreceptor on the surface of the aluminum substrate according to the present invention. The formation of each layer is performed by a step of forming a coating film formed of an application liquid containing solids (or raw material components thereof) constituting each layer and a solvent, and a step of curing the coating film. A specific method for producing the photoreceptor will be described below by taking the method for producing the photoreceptor 1 shown in FIG. 2 as an example.

The photoreceptor 1 can be produced, for example, through the following steps.

Step (1): a step of applying an application liquid for forming an intermediate layer to the surface of a support (aluminum substrate) 101 and drying the application liquid to form an intermediate layer 102, Step (2): a step of applying an application liquid for forming a charge generation layer to the surface of the intermediate layer 102 and drying the application liquid to form a charge generation layer 103, Step (3): a step of applying an application liquid for forming a charge transport layer to the surface of the charge generation layer 103 and drying the application liquid to form a charge transport layer 104, Step (4): a step of applying an application liquid for forming a surface protective layer to the surface of the charge transport layer 104 to form a coating film, and curing the coating film to form a surface protective layer 105.

<Step (1): Formation of Intermediate Layer>

The intermediate layer 102 can be formed by applying an application liquid for forming an intermediate layer to the surface of the support (aluminum substrate) 101 to form a coating film, and drying the coating film. The application liquid for forming an intermediate layer can be prepared by dissolving a binder resin for an intermediate layer in a solvent and dispersing conductive particles therein.

As a means that disperses the conductive particles, an ultrasonic disperser, a ball mill, a sand mill, a homomixer, or the like can be used.

Examples of a method of applying an application liquid for forming an intermediate layer include known methods such as a dip coating method, a spray coating method, a spinner coating method, a bead coating method, a blade coating method, a beam coating method, and a slide hopper method (including a circular slide hopper method). The circular slide hopper method is a method used for coating an outer peripheral surface of a cylindrical or columnar article as a surface to be coated. The circular slide hopper method can be used as a method of applying an application liquid for forming an intermediate layer to the outer peripheral surface of a drum-shaped support (aluminum substrate).

The method for drying the coating film can be appropriately selected depending on the type of the solvent and the thickness of the coating film, but heat drying is preferred.

The solvent used in the step of forming an intermediate layer may be any solvent that satisfactorily disperses the conductive particles or the metal oxide particles and dissolves the binder resin for an intermediate layer.

Specifically, the solvent is preferably an alcohol-based solvent having 1 to 4 carbon atoms, such as methanol, ethanol, n-propyl alcohol, isopropyl alcohol, n-butanol, t-butanol, or sec-butanol. With these solvents, the solubility of the binder resin and the coating performance are excellent.

Furthermore, a co-solvent can be used in combination with the above-described solvent in order to improve the storage stability and the dispersibility of particles, and examples thereof include benzyl alcohol, toluene, methylene chloride, cyclohexanone, and tetrahydrofuran.

The concentration of the binder resin for an intermediate layer in the application liquid for forming an intermediate layer is appropriately selected according to the thickness of the intermediate layer and the production rate.

<Step (2): Formation of Charge Generation Layer>

The charge generation layer 103 can be formed by applying an application liquid for forming a charge generation layer to the surface of the intermediate layer 102 to form a coating film, and drying the coating film. The application liquid for forming a charge generation layer can be prepared by dispersing the charge generation compound in a solution prepared by dissolving the binder resin for a charge generation layer in a solvent.

As a means that disperses the charge generation compound in the application liquid for forming the charge generation layer, for example, an ultrasonic disperser, a ball mill, a sand mill, or a homomixer can be used.

Examples of the method for applying the application liquid for forming the charge generation layer include known methods such as a dip coating method, a spray coating method, a spinner coating method, a bead coating method, a blade coating method, a beam coating method, and a slide hopper method. The slide hopper method includes a circular slide hopper method.

The method for drying the coating film can be appropriately selected depending on the type of the solvent and the thickness of the coating film, but heat drying is preferred.

Examples of solvents that may be used to form the charge generation layer include toluene, xylene, methylene chloride, 1,2-dichloroethane, methyl ethyl ketone, cyclohexane, ethyl acetate, t-butyl acetate, methanol, ethanol, propanol, butanol, methyl cellosolve, 4-methoxy-4-methyl-2-pentanone, ethyl cellosolve, tetrahydrofuran, 1-dioxane, 1,3-dioxolane, pyridine, and diethylamine.

<Step (3): Formation of Charge Transport Layer>

The charge transport layer 104 can be formed by applying an application liquid for forming a charge transport layer to the surface of the charge generation layer 103 to form a coating film, and drying the coating film. The application liquid for forming a charge transport layer can be prepared by dissolving a binder resin for a charge transport layer and a charge transport compound in a solvent.

Examples of a method for applying an application liquid for forming a charge transport layer include known methods such as a dip coating method, a spray coating method, a spinner coating method, a bead coating method, a blade coating method, a beam coating method, and a slide hopper method. The slide hopper method includes a circular slide hopper method.

The method for drying the coating film can be appropriately selected depending on the type of the solvent and the thickness of the coating film, but heat drying is preferred.

Examples of the solvent used for forming the charge transport layer 104 include toluene, xylene, methylene chloride, 1,2-dichloroethane, methyl ethyl ketone, cyclohexanone, ethyl acetate, butyl acetate, methanol, ethanol, propanol, butanol, tetrahydrofuran, 1,4-dioxane, 1,3-dioxolane, pyridine, and diethylamine.

<Step (4): Formation of Surface Protective Layer>

The surface protective layer 105 can be formed by applying an application liquid for forming a surface protective layer to the surface of the charge transport layer 104 to form a coating film, and curing the coating film.

The application liquid for forming a surface protective layer can be typically prepared by dissolving or dispersing a composition for forming a surface protective layer in a solvent. However, when the composition for forming a surface protective layer is a liquid composition having a viscosity such that the composition can be applied to the surface of the charge transport layer, it is not necessary to use a solvent. In this case, the composition for forming a surface protective layer itself can be used as the application liquid for forming a surface protective layer.

Examples of solvents used for forming the surface protective layer include methanol, ethanol, n-propyl alcohol, isopropyl alcohol, n-butanol, t-butanol, sec-butanol, benzyl alcohol, toluene, xylene, dichloromethane, methyl ethyl ketone, cyclohexane, ethyl acetate, butyl acetate, methyl cellosolve, ethyl cellosolve, tetrahydrofuran, 1,4-dioxane, 1,3-dioxolane, pyridine, and diethylamine.

Examples of a method for applying the application liquid for forming a surface protective layer include known methods such as a slide hopper method, a dip coating method, a spray coating method, a spinner coating method, a bead coating method, a blade coating method, and a beam coating method. The slide hopper method includes a circular slide hopper method.

After the application of the application liquid for forming a surface protective layer, the reaction components in the coating film are reacted to cure the coating film, thereby forming the surface protective layer 105.

The coating film may be subjected to the curing treatment without drying, but is preferably subjected to the curing treatment after natural drying or heat drying.

The drying conditions can be appropriately selected depending on the type of the solvent, the thickness of the coating film, and the like. The drying temperature is preferably in a range of room temperature (25° C.) to 180° C., particularly preferably in a range of 80 to 140° C. The drying time is preferably 1 to 200 minutes, and particularly preferably 5 to 100 minutes.

In the curing treatment for curing the coating film, the coating film is, for example, irradiated with ultraviolet rays to generate radicals and undergo a polymerization reaction of polymerizable compounds.

As the ultraviolet light source, any light source can be used without limitation as long as it generates ultraviolet rays. Examples of the ultraviolet light source that can be used include a low-pressure mercury lamp, a medium pressure mercury lamp, a high-pressure mercury lamp, an ultra-high pressure mercury lamp, a carbon arc lamp, a metal halide lamp, a xenon lamp, and flash (pulse) xenon.

The irradiation conditions vary depending on each lamp, but for example, the irradiation amount of the ultraviolet rays is usually in a range of 5 to 500 $mJ/cm^2$, preferably in a range of 5 to 100 $mJ/cm^2$. The power of the lamp is preferably in a range of 0.1 to 5 kW, particularly preferably in a range of 0.5 to 3 kW. An irradiation time for obtaining a necessary irradiation amount of ultraviolet rays is, for example, preferably 0.1 seconds to 10 minutes, and from the viewpoint of working efficiency, more preferably 0.1 seconds to 5 minutes.

In the step of forming a surface protective layer, drying can be appropriately performed before, after, and during the irradiation with ultraviolet rays.

2. Developing roller

[Configuration of Developing Roller]

A developing roller according to the present invention includes a developing sleeve.

The "developing sleeve" is a means having a function of bearing an appropriately charged developer and supplying the developer to a photoreceptor on which an electrostatic latent image is formed.

The developing sleeve is, for example, a part of a developing roller included in a developing device included in an electrophotographic image forming apparatus. The developing roller includes a developing sleeve, a flange, a shaft, and a member that generates a magnetic flux.

Note that the above-described "member generates a magnetic flux" is generally used as a magnet roller, and thus, in the following description, the "member that generates a magnetic flux" is simply referred to as the "magnet roller".

Figure 3:
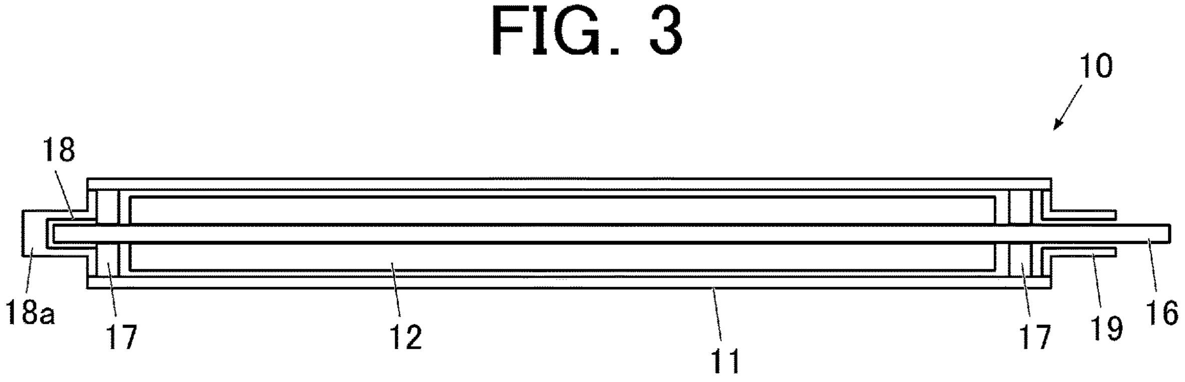
FIG. 3 is a cross-sectional view of the developing roller as viewed from a direction perpendicular to the axial direction.
Figure 4:
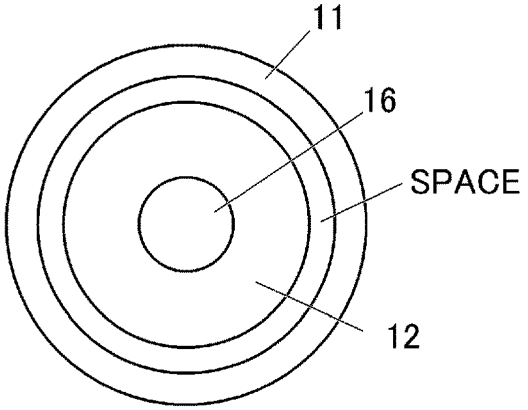
FIG. 4 is a cross-sectional view of the developing roller of FIG. 3 as viewed from the axial direction.

FIG. 3 is a cross-sectional view of the developing roller as viewed from a direction perpendicular to the axial direction. FIG. 4 is a cross-sectional view of the developing roller of FIG. 3 as viewed from the axial direction. In FIG. 3, reference numeral 10 denotes a developing roller.

The above-described developing sleeve is rotatable and cylindrical, and plays a role of bearing and conveying the developer on the surface thereof.

As shown in FIG. 3, a substantially cylindrical developing sleeve 11 is provided, and a first flange 18 and a second flange 19 are fixedly attached to both end portions of the developing sleeve 11.

The first flange 18 is formed with a shaft portion 18*a* projecting leftward, and a recessed portion is formed at a substantially central portion of a right portion of the first flange 18.

A through hole is formed at a substantially central portion of the second flange 19, and a shaft 16 is provided coaxially with the developing sleeve 11 at a central portion of the developing sleeve 11.

A left end portion of the shaft 16 is rotatably supported by the first flange 18 via bearings 17 mounted on the recessed portion.

A right end portion of the shaft 16 is rotatably supported by the second flange 19 via a bearing 17 mounted in the through hole, and extends rightward through the through hole.

In the developing sleeve 11, a substantially cylindrical magnet roller 12 is externally fitted and fixed to the shaft 16 in a non-contact state with an inner circumferential surface of the developing sleeve 11 (see FIG. 4).

The magnet roller 12 fixed to the shaft 16 is relatively rotatably supported by the developing sleeve 11 through a first flange 18 and a second flange 19.

The magnet roller 12 has a general configuration made of a resin magnet or a sintered magnet in which a plurality of magnetic poles are formed in a circumferential direction of an outer peripheral part.

As the magnet roller, for example, a magnet roller in which S poles and N poles of magnets are alternately arranged in a circumferential direction of an outer circumferential portion thereof or a magnet roller in which S poles and N poles of magnets are arranged so as to form a predetermined magnetic pattern is adopted.

The developing sleeve according to the present invention preferably contains an aluminum alloy.

The aluminum alloy is a conductive material having a relatively low electrical resistance. When the developing sleeve is rotated with respect to the magnet roller, the developing sleeve crosses magnetic lines of force generated from the magnet roller.

Thus, an electromagnetic induction action occurs, and an eddy current is generated around the surface of the developing sleeve described above.

3. Toner for Developing Electrostatic Image

[Toner Base Particles]

The toner base particles constituting the toner for developing an electrostatic image according to the present invention contain, for example, a binding resin, and if necessary, a colorant, a release agent, and other additives.

The glass transition point (Tg) of the toner according to the present invention is in a range of 0 to 45° C. as described above.

In the present invention, the term "toner particles" refers to toner base particles to which an external additive is added, and an aggregate of toner particles is referred to as a "toner".

In general, the toner base particles can be used as toner particles as they are, but in the present invention, toner particles obtained by adding an external additive to the toner base particles are used as toner particles.

In the following description, the toner base particles and the toner particles are also simply referred to as "toner particles" when it is not particularly necessary to distinguish therebetween.

The constituent materials of the toner base particles according to the present invention are described in detail below.

<Binding Resin>

The toner base particles contain polyester as a binding resin. In particular, the main component of the binding resin is preferably polyester.

Here, the "main component of the binding resin is polyester" means that polyester accounts for 50% by mass or more of the entire binding resin.

Polyester is a dehydration condensation reaction system, has particularly good compatibility with paper, and has high internal cohesive force. Thus, in particular, since the folding fixability after the completion of fixing is high, further low-temperature fixing can be achieved.

Note that the term "folding fixability" refers to, for example, a property that indicates the ease with which a toner layer is peeled off at a fold line portion when a toner image is formed in the shape of a black belt with toner using paper as a recording medium, the toner image is fixed, and then the paper is folded in two and unfolded again.

When the "folding fixability" is high, the destruction of the toner layer as described above does not occur, and good fixability can be achieved.

When the aluminum substrate contains silicon as described above, protrusions are formed on the surface of the aluminum substrate, which is advantageous for transfer in terms of adhesion to the toner. However, since minute leakage also occurs, the effect of the protrusion cannot be fully exhibited. Then, by suppressing the above-described minute leakage by using a resin having much polarity, such as polyester, for the toner, and polarizing the toner at the time of transfer, further improvement of the transferability can be expected.

From the above, it is preferable that the binding resin contains the polyester in a range of 50 to 95% by mass from the viewpoint of improvement in low-temperature fixability and transferability.

The toner particles may contain an amorphous polyester and a crystalline polyester as binding resins.

Either a crystalline resin or an amorphous resin may be used, but a crystalline resin provides a sharp-melting property.

The term "crystalline" refers to having a clear endothermic peak rather than a stepwise endothermic change in differential scanning calorimetry (DSC). The term "crystalline" specifically means that the half-value width of the endothermic peak is 10° C. or less when measured at a temperature increase rate of 10 (° C./min).

On the other hand, the term "amorphous" refers to having a half width of more than 10° C., exhibiting a stepwise change in endothermic amount, or having no clear endothermic peak.

(Amorphous Polyester)

The amorphous polyester is preferably contained in a range of 50 to 88% by mass, and more preferably in a range of 60 to 80% by mass, with respect to the total amount of the binding resin.

Examples of the amorphous polyester include a condensation polymer of a polyvalent carboxylic acid and a polyvalent alcohol.

As the amorphous polyester, a commercially available product may be used, or a synthesized product may be used.

[Polyvalent Carboxylic Acid]

Examples of the polyvalent carboxylic acid include an aliphatic dicarboxylic acid, an alicyclic dicarboxylic acid, an aromatic dicarboxylic acid, an anhydride thereof, and a lower alkyl ester thereof. Among these, as the polyvalent carboxylic acid, for example, an aromatic dicarboxylic acid is preferable.

Examples of the aliphatic dicarboxylic acid include oxalic acid, malonic acid, maleic acid, fumaric acid, citraconic acid, itaconic acid, glutaconic acid, succinic acid, alkenylsuccinic acid, adipic acid, and sebacic acid.

Examples of the alicyclic dicarboxylic acid include cyclohexanedicarboxylic acid.

Examples of the aromatic dicarboxylic acid include terephthalic acid, isophthalic acid, phthalic acid, and naphthalenedicarboxylic acid.

Examples of the lower alkyl ester include those having 1 to 5 carbon atoms.

As the polyvalent carboxylic acid, a trivalent or higher valent carboxylic acid having a crosslinked structure or a branched structure may be used in combination with the dicarboxylic acid.

Examples of the trivalent or higher valent carboxylic acid include trimellitic acid, pyromellitic acid, an anhydride thereof, and a lower alkyl ester thereof.

Examples of the lower alkyl ester include those having 1 to 5 carbon atoms.

The polyvalent carboxylic acid may be used alone or in combination of two or more kinds thereof.

[Polyvalent Alcohol]

Examples of the polyvalent alcohol include an aliphatic diol, an alicyclic diol, and an aromatic diol.

Among these, as the polyvalent alcohol, an aromatic diol and an alicyclic diol are preferable, and an aromatic diol is more preferable.

Examples of the aliphatic diol include ethylene glycol, diethylene glycol, triethylene glycol, propylene glycol, butanediol, hexanediol, and neopentyl glycol.

Examples of the alicyclic diol include cyclohexanediol, cyclohexanedimethanol, and hydrogenated bisphenol A.

Examples of the aromatic diol include an ethylene oxide adduct of bisphenol A and a propylene oxide adduct of bisphenol A.

As the polyvalent alcohol, a trivalent or higher valent alcohol having a crosslinked structure or a branched structure may be used in combination with the diol.

Examples of the trivalent or higher valent alcohol include glycerin, trimethylolpropane, and pentaerythritol.

The polyvalent alcohol may be used alone or in combination of two or more kinds thereof.

[Glass Transition Point of Amorphous Polyester]

The amorphous polyester may be used inside the toner or used as a shell material of the toner surface layer.

In the case of using the amorphous polyester inside the toner, the glass transition point (Tg) is preferably in a range of −5 to 40° C. and more preferably in a range of 0 to 30° C.

In the case of using the amorphous polyester as a shell material, the glass transition point (Tg) of the amorphous polyester is preferably in a range of 50 to 80° C., and more preferably in a range of 50 to 65° C.

The glass transition point is determined from a DSC curve obtained by differential scanning calorimetry (DSC).

To be more specific, the glass transition point is determined by the "extrapolated glass-transition starting temperature" described in the method for determining a glass transition point in JIS K-7121-1987 "Testing Methods for Transition Temperatures of Plastics".

Others

In the present embodiment, two or more kinds of amorphous polyesters may be used in combination.

In this case, the absolute value of the difference in SP value between the amorphous polyester having the largest SP value and the amorphous polyester having the smallest SP value is preferably 0.25 or less, more preferably in a range of 0.01 to 0.25, and still more preferably in a range of 0.10 to 0.25.

When the absolute value of the difference between the SP values is 0.25 or less, the compatibility between the crystalline polyester and the amorphous polyester can be adjusted to an appropriate range.

The amorphous polyester is obtained by a well-known production method.

Specifically, for example, the amorphous polyester is obtained by a method in which a polymerization temperature is set in a range of 180 to 230° C., the pressure in the reaction system is reduced as necessary, and the reaction is performed while water or alcohol generated at the time of condensation is removed.

When the monomers as starting materials are not dissolved or compatible at the reaction temperature, a solvent having a high boiling point may be added as a solubilizing agent to dissolve the monomers.

In this case, the polycondensation reaction is carried out while distilling off the solubilizing agent.

In the case where a monomer having poor compatibility is present in the copolymerization reaction, the monomer having poor compatibility and an acid or alcohol to be polycondensed with the monomer may be condensed in advance, and then polycondensed with the main component.

In the present embodiment, examples of a method of adjusting the SP value of the amorphous polyester include a method of selecting the kinds of the polyvalent carboxylic acid and the polyvalent alcohol constituting the amorphous polyester so that the SP value of the amorphous polyester becomes a desired value.

(Crystalline Polyester)

The crystalline polyester is preferably contained in a range of 5 to 35% by mass, and more preferably in a range of 10 to 30% by mass, with respect to the total amount of the binding resin.

Examples of the crystalline polyester include a polycondensate of a polyvalent carboxylic acid and a polyvalent alcohol.

Note that as the crystalline polyester, a commercially available product may be used, or a synthesized product may be used.

Here, since the crystalline polyester easily forms a crystal structure, a polycondensate using a polymerizable monomer having a linear aliphatic group is more preferable than a polymerizable monomer having an aromatic group.

[Polyvalent Carboxylic Acid]

Examples of the polyvalent carboxylic acid include an aliphatic dicarboxylic acid, an aromatic dicarboxylic acid, an anhydride thereof, and a lower alkyl ester thereof.

Examples of the aliphatic dicarboxylic acid include oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid.

Examples of the aromatic dicarboxylic acid include dibasic acids such as phthalic acid, isophthalic acid, terephthalic acid, and naphthalene-2,6-dicarboxylic acid.

Examples of the lower alkyl ester include those having 1 to 5 carbon atoms.

As the polyvalent carboxylic acid, a trivalent or higher valent carboxylic acid having a crosslinked structure or a branched structure may be used in combination with the dicarboxylic acid.

Examples of the trivalent carboxylic acid include an aromatic dicarboxylic acid, an anhydride thereof, and a lower alkyl ester thereof.

Examples of the aromatic carboxylic acids include 1,2,3-benzenetricarboxylic acid, 1,2,4-benzenetricarboxylic acid, and 1,2,4-naphthalenetricarboxylic acid.

Examples of the lower alkyl ester include those having 1 to 5 carbon atoms.

As the polyvalent carboxylic acid, a dicarboxylic acid having a sulfonic acid group and a dicarboxylic acid having an ethylenic double bond may be used in combination with these dicarboxylic acids.

The polyvalent carboxylic acid may be used alone or in combination of two or more kinds thereof.

[Polyvalent Alcohol]

Examples of the polyvalent alcohol include aliphatic diols, and, for example, a linear aliphatic diol in which the number of carbon atoms of the main chain portion is in a range of 7 to 20 is preferable.

Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosandecanediol.

Among these, 1,8-octanediol, 1,9-nonanediol, and 1,10-decanediol are preferable.

As the polyvalent alcohol, a trivalent or higher valent alcohol having a crosslinked structure or a branched structure may be used in combination with the diol.

Examples of the trivalent or higher valent alcohol include glycerin, trimethylolethane, trimethylolpropane, and pentaerythritol.

The polyvalent alcohol may be used alone or in combination of two or more kinds thereof.

Here, in the polyvalent alcohol, the content of the aliphatic diol may be 80 mol % or more, and is preferably 90 mol % or more.

[Melting Temperature of Crystalline Polyester]

The melting temperature of the crystalline polyester is preferably in a range of 55 to 80° C., more preferably in a range of 55 to 78° C., and still more preferably in a range of 55 to 76° C.

When the melting temperature of the crystalline polyester is 72 or higher, the heat storage property is further improved.

When the melting temperature of the crystalline polyester is 80° C. or lower, low-temperature fixability is further improved.

Note that the melting temperature is determined from a DSC curve obtained by differential scanning calorimetry (DSC), according to the "melting peak temperature" described in the method for determining a melting temperature of JIS K7121-1987 "Testing methods for transition temperatures of plastics".

Others

The crystalline polyester is obtained, for example, similarly to the amorphous polyester, by a well-known production method.

In the present embodiment, examples of a method of adjusting the SP value of the crystalline polyester include a method of selecting the kinds of the polyvalent carboxylic acid and the polyvalent alcohol constituting the crystalline polyester so that the SP value of the crystalline polyester becomes a desired value.

(Other Resins)

In the present embodiment, any other resin besides the amorphous polyester and the crystalline polyester may be used as the binding resin.

Examples of other binding resins include vinyl-based resins formed of homopolymers of monomers such as styrenes, (meth)acrylic acid esters, ethylenically unsaturated nitriles, vinyl ethers, vinyl ketones, and olefins, or copolymers obtained by combining two or more of these monomers.

Examples of the styrenes include styrene, p-chlorostyrene, and α-methylstyrene.

Examples of the (meth)acrylic acid esters include methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate.

Examples of the ethylenically unsaturated nitriles include acrylonitrile and methacrylonitrile.

Examples of the vinyl ethers include vinyl methyl ether and vinyl isobutyl ether.

Examples of the vinyl ketones include vinyl methyl ketone, vinyl ethyl ketone, and vinyl isopropenyl ketone.

Examples of the olefins include ethylene, propylene, and butadiene.

Examples of the binding resin include non-vinyl-based resins such as an epoxy resin, a polyurethane resin, a polyamide resin, a cellulose resin, a polyether resin, and a modified rosin.

In addition, a mixture of the resin as described above and the vinyl-based resin, or a graft polymer obtained by polymerizing a vinyl-based monomer in the co-presence of these may also be mentioned.

These other binding resins may be used alone or in combination of two or more kinds thereof.

In the present embodiment, a styrene-(meth)acrylic copolymer resin may be used as the other binding resin.

When a styrene-(meth)acrylic copolymer resin is used as the other binding resin, fixing property such as hot offset and heat storage property are further improved.

When a styrene-(meth)acrylic copolymer resin is used as the other binding resin, the proportion of the styrene-(meth)acrylic copolymer resin in the binding resin is preferably in a range of 5 to 25% by mass.

The above range is more preferably in a range of 5 to 20% by mass, and still more preferably in a range of 10 to 15% by mass.

When the proportion of the styrene-(meth)acrylic copolymer resin in the binding resin is 5 or more, fixing property such as hot offset and heat storage property are further improved.

When the proportion of the styrene-(meth)acrylic copolymer resin in the binding resin is 25% by mass or less, the low-temperature fixability is further improved.

In the present embodiment, (meth)acryl means acryl or methacryl.

The styrene-(meth)acrylic copolymer resin can be synthesized by various polymerization methods, for example, solution polymerization, precipitation polymerization, suspension polymerization, precipitation polymerization, bulk polymerization, and emulsion polymerization.

The polymerization reaction can be carried out by a known operation such as a batch system, a semi-continuous system or a continuous system.

As a preferred combination of the binding resins according to the present invention, an amorphous polyester and a crystalline polyester are used in combination. It is preferable that the amorphous polyester is contained in a range of 65 to 95% by mass and the crystalline polyester is contained in a range of 5 to 35% by mass with respect to the binding resin. Alternatively, only the styrene-(meth)acrylic copolymer resin may be used as the binding resin.

<Colorant>

Examples of the colorant include a pigment and a dye.

Examples of the pigment include carbon black, chrome yellow, Hansa yellow, benzidine yellow, threne yellow, quinoline yellow, pigment yellow, permanent orange GTR, pyrazolone orange, vulcan orange, Watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate.

Examples of the dye include acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorants may be used alone or in combination of two or more kinds thereof.

As the colorant, a surface-treated colorant may be used as necessary, and a dispersant may be used in combination. In addition, a plurality of types of colorants may be used in combination.

The content of the colorant is, for example, preferably in a range of 1 to 30% by mass and more preferably in a range of 3 to 15% by mass with respect to the entirety of the toner particles.

<Release Agent>

Examples of the release agent include hydrocarbon waxes.

Other examples include, but are not limited to, natural waxes, synthetic or mineral/petroleum-based waxes, and ester-based waxes.

Examples of the natural wax include carnauba wax, rice wax, and candelilla wax.

Examples of the synthetic or mineral/petroleum-based wax include montan wax.

Examples of the ester wax include fatty acid esters and montanic acid esters.

The melting temperature of the release agent is preferably in a range of 50 to 110° C., and more preferably in a range of 60 to 100° C.

Note that the melting temperature is determined from a DSC curve obtained by differential scanning calorimetry (DSC), according to the "melting peak temperature" described in the method for determining a melting temperature of JIS K-7121-1987 "Testing methods for transition temperatures of plastics".

The content of the release agent is, for example, preferably in a range of 1 to 20% by mass and more preferably in a range of 5 to 15% by mass with respect to the entirety of the toner particles.

<Other Additives>

Examples of the other additives include well-known additives such as a magnetic body, a charge control agent, and an inorganic powder, and these additives are included in the toner particles as internal additives.

(Magnetic Body)

Examples of the magnetic body include iron oxides such as magnetite, hematite, and ferrite; metals such as iron, cobalt, and nickel; alloys of these metals and metals such as aluminum, cobalt, copper, lead, magnesium, tin, zinc, antimony, bismuth, calcium, manganese, titanium, tungsten, and vanadium; and mixtures thereof.

Examples of the shape of the magnetic body include a polyhedron, an octahedron, a hexahedron, a spherical shape, a needle-like shape, and a scale-like shape, and a shape having little anisotropy, such as a polyhedron, an octahedron, a hexahedron, or a spherical shape, is preferable from the viewpoint of increasing the image density.

The magnetic body has a number average particle size in a range of 0.10 to 0.40 μm.

Generally, the smaller the particle size of the magnetic body, the greater the coloring strength while the more readily the magnetic body aggregates, so the above range is preferable from the viewpoint of the balance between the coloring strength and the aggregation property.

Note that the number average particle size of the magnetic body can be measured with a transmission electron microscope.

Specifically, toner particles to be observed are sufficiently dispersed in an epoxy resin, and then the epoxy resin is cured in an atmosphere at a temperature of 40° C. for 2 days to obtain a cured product.

The obtained cured product is made into a flaky sample by a microtome, and the diameters of 100 magnetic body particles in a visual field are measured in a photograph at a magnification of 10,000 to 40,000 times by a transmission electron microscope (TEM).

Then, the number average particle size is calculated based on the equivalent diameter of a circle equal to the projected area of the magnetic body.

The particle size can also be measured by an image analyzer.

The magnetic body used in the toner of the present invention can be produced, for example, by the following method.

An alkali such as sodium hydroxide is added to an aqueous ferrous salt solution in an amount equivalent to or more than equivalent to an iron component to prepare an aqueous solution containing ferrous hydroxide.

While the pH of the prepared aqueous solution is maintained at 7 or more, air is blown thereinto, and while the aqueous solution is heated to 70° C. or higher, an oxidation reaction of ferrous hydroxide is performed to produce seed crystals serving as cores of a magnetic iron oxide powder.

Next, an aqueous solution containing about 1 equivalent of ferrous sulfate based on the addition amount of the alkali previously added is added to the slurry-like liquid containing the seed crystals.

While the pH of the liquid is maintained in a range of 5 to 10, the reaction of the ferrous hydroxide is allowed to proceed while blowing air, and the magnetic iron oxide powder is grown with the seed crystals as cores.

At this time, the shape and magnetic properties of the magnetic body can be controlled by selecting arbitrary pH, reaction temperature, and stirring conditions.

As the oxidation reaction proceeds, the pH of the liquid shifts to the acidic side, but it is preferable that the pH of the liquid is not less than 5.

The magnetic body thus obtained can be filtered, washed, and dried by standard methods to obtain the desired magnetic body.

When the toner is produced in an aqueous medium in the present invention, the surface of the magnetic body is very preferably subjected to a hydrophobic treatment.

When the surface treatment is performed by a dry method, the washed, filtered, and dried magnetic body is subjected to a coupling agent treatment.

When the surface treatment is performed by a wet method, after the completion of the oxidation reaction, the dried product is redispersed.

Alternatively, after completion of the oxidation reaction, the iron oxide body obtained by washing and filtration is not dried and is redispersed in another aqueous medium to perform the coupling treatment.

In the present invention, either a dry method or a wet method can be appropriately selected.

The content of the magnetic body in the toner can be measured as follows using a thermal analyzer TGA7 manufactured by PerkinElmer, Inc.

The toner is heated from normal temperature to 900° C. at a temperature increase rate of 25° C./min under a nitrogen atmosphere.

The weight loss (% by mass) from 100° C. to 750° C. is defined as the amount of binding resin, and the remaining mass is approximately defined as the amount of magnetic body.

(Charge Control Agent)

In order to stabilize chargeability, a charge control agent is preferably used.

As such a charge control agent, any known charge control agents can be used alone or in combination.

In consideration of adaptability to color toner, a quaternary ammonium salt compound is preferable as a positively chargeable charge control agent. The adaptability to color toner means that the charge control agent itself is colorless or light-colored and does not impair the color tone of the toner.

As the negatively chargeable charge control agent, a metal salt or a metal complex of salicylic acid or alkylsalicylic acid with chromium, zinc, aluminum or the like, a metal salt or a metal complex of benzilic acid, an amide compound, a phenol compound, a naphthol compound, a phenolamide compound or the like is preferred.

Alternatively, the negatively chargeable charge control agent may be a polymer exhibiting negative chargeability, such as a sulfonate salt, a carboxylate salt, or a halogen.

<Characteristics of Toner Particles>

The toner particles may each be a toner particle having a single-layer structure, or a toner particle having a so-called core-shell structure composed of a core (core particle) and a coating layer (shell layer) coating the core.

The toner particles having a core-shell structure is preferably composed of a core containing, for example, a binding resin and, if necessary, other additives such as a colorant and a release agent, and a coating layer containing a binding resin.

The volume average particle size ($D_{50}v$) of the toner particles is preferably in a range of 2 to 10 μm, and more preferably in a range of 4 to 8 μm.

Note that various average particle sizes and various particle size distribution indices of the toner particles are measured using Coulter Multisizer II (manufactured by Beckman Coulter, Inc.), and ISOTON-II (manufactured by Beckman Coulter, Inc.) as an electrolyte.

In the measurement, to 2 mL of a 5% aqueous solution of a surfactant (preferably sodium alkylbenzene sulfonate) as a dispersant, a measurement sample is added in a range of 0.5 to 50 mg.

This is added to an electrolytic solution in a range of 100 to 150 mL.

The electrolytic solution in which the sample is suspended is subjected to a dispersion treatment for 1 minute with an ultrasonic disperser, and the particle size distribution of particles having a particle size in a range of 2 to 60 μm is measured with Coulter Multisizer II using an aperture having an aperture diameter of 100 μm. Note that the number of particles to be sampled is 50000.

Cumulative distributions of volume and number are drawn from the small particle size side for particle size ranges (channels) divided on the basis of the measured particle size distribution. At this time, the particle size at cumulative 16% is defined as volume particle size $D_{16}v$, number particle size $D_{16}p$, the particle size at cumulative 50% is defined as volume average particle size $D_{50}v$, cumulative number average particle size $D_{50}p$, and the particle size at cumulative 84% is defined as volume particle size $D_{84}v$, number particle size $D_{84}p$.

Using these, the volume average particle size distribution index (GSDv) is calculated as $(D_{84}v/D_{16}v)^{1/2}$, and the number average particle size distribution index (GSDp) is calculated as $(D_{84}p/D_{16}p)^{1/2}$.

[External Additive]

Examples of the external additive include inorganic particles.

Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_m$, $Al_2O_3{\cdot}2SiO_2$, $CaCO_3$, $MgCO_3$, $BaSO_4$ and $MgSO_4$ and inorganic chlorides such as titanates.

The surfaces of the inorganic particles as the external additive is preferably subjected to a hydrophobic treatment.

The hydrophobic treatment is performed, for example, by immersing the inorganic particles in a hydrophobic treatment agent.

The hydrophobic treatment agent is not particularly limited, and examples thereof include a silane-based coupling agent, a silicone oil, a titanate-based coupling agent, and an aluminum-based coupling agent.

These may be used alone or in combination of two or more kinds thereof.

The amount of the hydrophobic treatment agent is usually, for example, in a range of 1 to 10 parts by mass relative to 100 parts by mass of the inorganic particles.

Examples of the external additive include resin particles and a cleaning lubricant.

Examples of the resin particles include resin particles of polystyrene, polymethyl methacrylate (PMMA), a melamine resin, and the like.

Examples of the cleaning lubricant include metal salts of higher fatty acids, typified by zinc stearate, and fluorine-based polymer particles.

The addition amount of the external additive is, for example, preferably in a range of 0.01 to 5% by mass and more preferably in a range of 0.01 to 2.0% by mass with respect to the entirety of the toner particles.

[Method for Producing Toner for Developing Electrostatic Image]

Next, a method for producing the toner according to the present invention will be described.

The toner according to the present embodiment is obtained by producing toner particles and then externally adding an external additive to the toner particles.

The toner particles may be prepared by any one of a dry method (e.g., a kneading-pulverization method) and a wet method (e.g., an aggregation-coalescence method, a suspension polymerization method, and a dissolution-suspension method).

The "aggregation-coalescence method" is also referred to as an "emulsion association method".

The method for producing the toner particles is not particularly limited to these production methods, and well-known production methods are adopted.

Some examples of the method for producing the toner particles are described below.

<Aggregation-Coalescence Method>

The aggregation-coalescence method includes, for example, three steps of (1) a step of preparing a resin particle dispersion, (2) a step of forming aggregated particles, and (3) a step of fusion and coalescence.

Details of each step are described below.

Note that in the following description, a method for obtaining toner particles containing a colorant and a release agent will be described, but the colorant and the release agent are used as necessary. Of course, additives other than the colorant and the release agent may be used.

(1) Resin Particle Dispersion Preparation Step

The resin particle dispersion preparation step is a step of preparing a resin particle dispersion in which resin particles to be a binding resin are dispersed. Here, the binding resin is preferably selected such that the glass transition point of the toner to be produced is in the range of 0 to 45° C.

First, together with a resin particle dispersion in which resin particles serving as a binding resin are dispersed, for example, a colorant particle dispersion in which colorant particles are dispersed and a release agent particle dispersion in which release agent particles are dispersed are prepared.

Here, the resin particle dispersion is prepared, for example, by dispersing resin particles in a dispersion medium with a surfactant.

(Dispersion Medium)

Examples of the dispersion medium for use in the resin particle dispersion include aqueous medium.

Examples of the aqueous medium include water such as distilled water and ion-exchanged water, and alcohols. These may be used alone or in combination of two or more kinds thereof.

(Surfactant)

Examples of the surfactant include an anionic surfactant, a cationic surfactant, and a nonionic surfactant, and in particular, an anionic surfactant and a cationic surfactant are preferable.

The nonionic surfactant may be used in combination with an anionic surfactant or a cationic surfactant.

The surfactants may be used alone or in combination of two or more kinds thereof.

Examples of the anionic surfactant include sulfate ester salt-based, sulfonate salt-based, phosphate ester-based, and soap-based anionic surfactants.

Examples of the cationic surfactant include an amine salt type and a quaternary ammonium salt type.

Examples of the nonionic surfactant include polyethylene glycol-based, alkylphenol ethylene oxide adduct-based, and polyvalent alcohol-based surfactants.

(Distribution Method)

In the resin particle dispersion, examples of a method of dispersing the resin particles in the dispersion medium include general dispersion methods using, for example, a rotary shear-type homogenizer, or a ball mill, a sand mill, or a Dyno mill having media.

In addition, depending on the type of the resin particles, the resin particles may be dispersed in the resin particle dispersion using, for example, a phase inversion emulsification method.

Note that the phase inversion emulsification method is the following method.

A resin to be dispersed is dissolved in a hydrophobic organic solvent in which the resin is soluble, and a base is added to the organic continuous phase (O phase) for neutralization.

Thereafter, by adding an aqueous medium (W phase), the resin is converted from W/O to O/W (so-called phase inversion) to form a discontinuous phase, and the resin is dispersed in the form of particles into the aqueous medium.

In addition, the resin particle dispersion may be subjected to conventionally known emulsion polymerization or the like to form resin particles, and the resin particles may be aggregated and fused to form binding resin particles.

Specifically, polymerizable monomers constituting the binding resin are charged and dispersed in an aqueous medium, and the polymerizable monomers are polymerized by a polymerization initiator to produce a binding resin particle dispersion.

Note that such a method of producing a resin particle dispersion from polymerizable monomers is referred to as an emulsion polymerization method. Then, as a method for producing a toner using a dispersion obtained by the emulsion polymerization method or the like, there is the above-described emulsion association method.

(Volume Average Particle Size of Resin Particles)

The volume average particle size of the resin particles dispersed in the resin particle dispersion is, for example, preferably in a range of 0.01 to 1 μm, more preferably in a range of 0.08 to 0.8 μm, and still more preferably in a range of 0.1 to 0.6 μm.

The volume average particle size of the resin particles can be measured by a laser diffraction particle size distribution analyzer.

Example of the laser diffraction particle size distribution analyzer include "LA-700" (manufactured by Horiba, Ltd.).

Using the particle size distribution obtained by measurement with the above-described analyzer, a cumulative distribution is drawn from the small particle size side for the volume with respect to the divided particle size ranges (channels).

Then, the particle size at which the cumulative percentage is 50% with respect to all the particles is measured as the volume average particle size $D_{50}v$.

Note that the volume average particle size of particles in other dispersions is also measured in the same manner.

(Content of Resin Particles)

The content of the resin particles in the resin particle dispersion is, for example, preferably in a range of 5 to 50% by mass and more preferably in a range of 10 to 40% by mass.

(Other Preparation Methods)

Note that, for example, a colorant particle dispersion and a release agent particle dispersion are also prepared in the same manner as the resin particle dispersion.

That is, the same applies to the colorant particles dispersed in the colorant particle dispersion and the release agent particles dispersed in the release agent particle dispersion with respect to the volume average particle size of particles, the dispersion medium, the dispersing method, and the content of particles in the resin particle dispersion.

(2) Aggregated Particle Forming Step

The aggregated particle forming step is a step of aggregating resin particles in a resin particle dispersion to form aggregated particles.

Note that the above-described resin particle dispersion may be a resin particle dispersion after being mixed with another particle dispersion, if necessary, and this may be aggregated to form aggregated particles.

Next, the resin particle dispersion, the colorant particle dispersion, and the release agent particle dispersion are mixed.

Then, the resin particles, the colorant particles, and the release agent particles are heteroaggregated in the mixed dispersion to form aggregated particles containing the resin particles, the colorant particles, and the release agent particles and having a diameter close to the diameter of the target toner particles.

Specifically, the aggregated particles are formed as follows.

For example, an aggregating agent is added to the mixed dispersion while the pH of the mixed dispersion is adjusted to be acidic, and a dispersion stabilizer is added as necessary.

At this time, the pH is adjusted in a range of 2 to 5.

Thereafter, the mixture is heated to a temperature of the glass transition point of the resin particles to aggregate the particles dispersed in the mixed dispersion, thereby forming aggregated particles.

At this time, the glass transition point is in a range of (glass transition point of resin particles—30° C.) to (glass transition point—10° C.).

In the aggregated particle forming step, for example, the aggregating agent may be added to the mixed dispersion at room temperature (for example, 25° C.) while stirring the mixed dispersion with a rotary shear-type homogenizer, the pH of the mixed dispersion may be adjusted to be acidic (for example, in a range of pH 2 to 5), a dispersion stabilizer may be added as necessary, and then the heating may be performed.

(Aggregating Agent)

Examples of the aggregating agent include a surfactant having a polarity opposite to that of a surfactant used as a dispersant to be added to the mixed dispersion.

Examples of the surfactant include inorganic metal salts and divalent or higher valent metal complexes.

In particular, when a metal complex is used as the aggregating agent, the amount of surfactant used is reduced, and the charging characteristics are improved.

An additive which forms a complex with a metal ion of the aggregating agent or a bond similar to the metal ion may be used as necessary.

As the additive, a chelating agent is suitably used.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may be used.

Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The addition amount of the chelating agent is, for example, relative to 100 parts by mass of the resin particles, preferably in a range of 0.01 to 5.0 parts by mass, and more preferably 0.1 parts by mass or more and less than 3.0 parts by mass.

(3) Fusion and Coalescence Step

The fusion and coalescence step is a step of heating the aggregated particle dispersion in which the aggregated particles are dispersed, fusing and coalescing the aggregated particles, and forming toner particles.

After the aggregated particle forming step, the aggregated particle dispersion in which the aggregated particles are dispersed is heated, for example, to a temperature equal to or higher than the glass transition point of the resin particles to fuse and coalesce the aggregated particles, thereby forming toner particles.

Through the above steps, toner particles are obtained.

After the aggregated particle dispersion in which the aggregated particles are dispersed is obtained, the toner particles may be manufactured through a step of forming a second aggregated particles and a step of fusing and coalescing the second aggregated particles to form toner particles having a core/shell structure.

Note that the step of forming the second aggregated particles is a step of further mixing the aggregated particle dispersion and the resin particle dispersion in which the resin particles are dispersed, and aggregating the resin particles so as to further attach the resin particles to the surfaces of the aggregated particles.

The step of fusing and coalescing the second aggregated particles to form toner particles having a core/shell structure is a step of heating the second aggregated particle dispersion in which the second aggregated particles are dispersed to fuse and coalesce the second aggregated particles to form toner particles having a core/shell structure.

Here, after the completion of the fusion and coalescence step, the toner particles formed in the solution are subjected to a known washing step, a solid-liquid separation step, and a drying step to obtain dry toner particles.

In the washing step, sufficient displacement washing with ion-exchanged water is preferably performed from the viewpoint of chargeability.

The solid-liquid separation step is not particularly limited, but suction filtration, pressure filtration, or the like is preferably performed from the viewpoint of productivity.

The drying step is also not particularly limited, but freeze drying, flash jet drying, fluidized drying, vibrating fluidized drying, or the like is preferably performed from the viewpoint of productivity.

In the present embodiment, after the toner particles are produced, the toner particles may be subjected to an annealing treatment under predetermined temperature conditions and heating time conditions.

The toner according to the present embodiment is produced by, for example, adding an external additive to the obtained dry toner particles and mixing them.

The mixing is preferably performed using, for example, a V blender, a Henschel mixer, or a Lödige mixer.

Furthermore, if necessary, coarse particles of the toner may be removed using a vibration sifter, a wind sifter, and the like.

<Pulverization Method>

In the case of producing the toner by a pulverization method, first, the binding resin, the wax, the charge control agent, and the like contained in the toner particles are sufficiently mixed with a mixer such as a Henschel mixer or a ball mill to obtain a mixture. Here, the binding resin is preferably selected such that the glass transition point of the toner to be produced is in the range of 0 to 45° C.

The toner particles may be magnetic toner particles, and may contain a magnetic body in addition to a binding resin, a wax, and a charge control agent.

Next, the obtained mixture is melted and kneaded by using a heat kneading machine such as a biaxial kneading extruder, a heating roll, a kneader, or an extruder, cooled and solidified, and then pulverized and classified. Thus, toner particles are obtained.

The toner can be produced by externally adding and mixing an external additive to the obtained toner particles.

Examples of the mixer include the following. Henschel mixer (manufactured by Mitsui Mining Co., Ltd.), Super-mixer (manufactured by Kawata Mfg Co., Ltd.), Ribocone (manufactured by Ohkawara Seisakusho Co., Ltd.), Nauta mixer, Turbulizer, Cyclomix (manufactured by Hosokawa Micron Corporation), Spiral Pin Mixer (manufactured by Pacific Machinery & Engineering Co., Ltd.), and Lödige Mixer (manufactured by MATSUBO Corporation).

Examples of the kneader include the following. KRC kneader (manufactured by Kurimoto Iron Works, Ltd.), Buss co kneader (manufactured by Buss), TEM embosser (manufactured by Toshiba Machine Co., Ltd.), TEX twin-screw kneader (manufactured by The Japan Steel Works, Ltd.), PCM kneader (manufactured by Ikegai Iron Works, Ltd.), a three roll mill, a mixing roll mill, a kneader (manufactured by Inoue Seisakusho Co., Ltd.), Kneadex (manufactured by Mitsui Mining Co., Ltd.), an MS type pressure kneader, Kneader-ruder (manufactured by Moriyama Seisakusho Co., Ltd.), and Banbury mixer (manufactured by Kobe Steel Works, Ltd.).

Examples of the pulverizer include the following. Counter Jet Mill, Micron Jet, innomizer (manufactured by Hosokawa Micron Corporation), IDS Mill, PJM Jet Pulverizer (manufactured by Nippon Pneumatic Mfg. Co., Ltd.), Cross Jet Mill (manufactured by Kurimoto, Inc.), Ulmax (manufactured by Nisso Engineering), SK Jet-O Mill (manufactured by Seishin Enterprise), Kryptron (manufactured by Kawasaki Heavy Industries, Ltd.), Turbo Mill (manufactured by Turbo Industries, Ltd.), and Super Rotor (manufactured by Nisshin Engineering).

Examples of the classifier include the following. Classoil, Micron Classifier, Spedic Classifier (manufactured by Seishin Enterprise Co., Ltd.), Turbo Classifier (manufactured by Nisshin Engineering Inc.), Micron Separator, Turboplex (ATP), TSP Separator (manufactured by Hosokawa Micron Corporation), Elbow Jet (manufactured by Nittetsu Mining Co., Ltd.), Dispersion Separator (manufactured by Nippon Pneumatic Industries, Ltd.), and YM Microcut (manufactured by Yasukawa Shoji Co., Ltd.).

As a mixing treatment device for mixing the external additive, a known mixing treatment device such as the mixer described above can be used.

Note that in a case where the pulverized toner is designed to be soft, it is necessary to separately make the surfaces thereof hard, and therefore, there is also a technique of fixing and coating the surfaces of the pulverized toner with fine particles of silica or the like, for example, using fine particles of silica or the like, such as "X24", whose particle size distribution is uniform around 110 nm.

Then, the toner base particles thus produced may be subjected to an external addition treatment for the purpose of a fluidizing agent.

(Surface Treatment with Hot Air)

The classified toner particles may be subjected to a heat treatment (spheroidizing) step.

The heat treatment (spheroidizing) can be performed by methods as described in JP S59-125743A or JP 2022-96557A. In the apparatus disclosed in JP S59-125743A, the processing is performed as follows.

Figure 5:
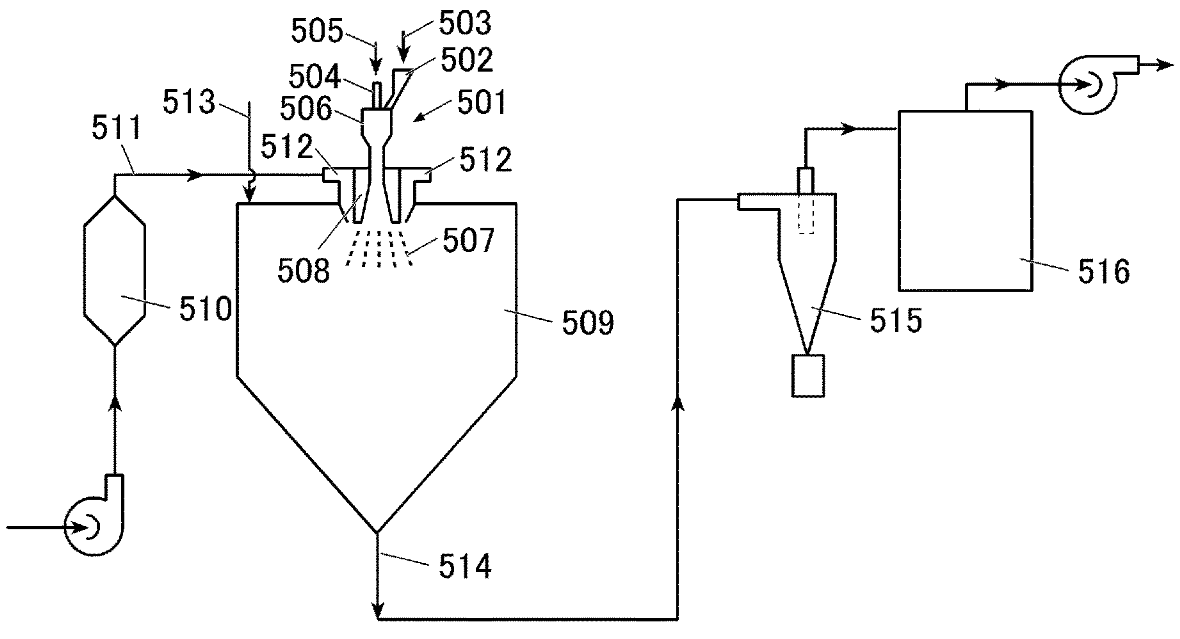
FIG. 5 is a schematic configurational view of a surface treatment apparatus using hot air.

The classified particles are subjected to heat treatment by, for example, a heat treatment (spheroidizing) apparatus shown in FIG. 5.

In the heat treatment apparatus, as shown in FIG. 5, in an ejector 501, toner particles 503 supplied from a hopper 502 are mixed with compressed air 505 from a nozzle 504 in a mixing chamber 506. The mixed and dispersed airflow 507 is ejected from a diffuser 508 into a heat treatment chamber 509. The hot air 511 heated by a heater 510 is first introduced into a hot-air swirling chamber 512 and made into a swirling flow, and then blown into the ejected dispersed airflow 507, to be thermally associated or mixed with the dispersed airflow 507 uniformly.

Cooling air 513 is introduced from the upper part of the side wall of a heat treatment chamber 509. The spheroidized toner in the heat treatment chamber 509 is cooled by the cooling air and collected by a cyclone 515 and a dust collector 516 through a discharge port 514.

<Suspension Polymerization Method>

The method of producing toner particles by suspension polymerization includes a dissolution step of uniformly dissolving or dispersing additives to obtain a polymerizable monomer composition, a granulation step of dispersing and granulating the polymerizable monomer composition in an aqueous medium containing a dispersion stabilizer using a suitable stirrer, a polymerization reaction step to perform a polymerization reaction, if necessary, by adding an aromatic solvent and a polymerization initiator, a cooling step of controlling the position and size of microdomains of a crystalline material, and a holding (annealing) step of controlling the degree of crystallinity of the crystalline material, to obtain toner particles having a desired particle size.

<Surface Modification of Toner>

The toner produced by the above-described method can be produced, for example, by fixing the fine particles to the surface of the core.

For fixing the fine particles to the surface of the core, for example, the core material and the inorganic fine particles are uniformly mixed, and the inorganic fine particles are electrostatically attached to the surface of the core material to produce an ordered mixture. Thereafter, mechanical and thermal impact forces are applied to drive and fix the inorganic fine particles into the core material.

The inorganic fine particles are not completely embedded in the core material, but are fixed so that a part of the inorganic particles protrudes from the core material.

Such an apparatus for fixing inorganic fine particles is commercially available as a surface modification apparatus or system, and examples thereof include the following.

(1) Dry mechanochemical method: Mechanochemical (Okada Seiko Co., Ltd.), Mechanofusion system (Hosokawa Micron Corporation)

(2) Impact method in high-speed airflow: hybridization system (Nara Machinery Co., Ltd.), Kryptron system (Kawasaki Heavy Industries, Ltd.)

(3) Wet method: DISPERCOAT (Nisshin Flour Milling Inc.), COATMIZER (Freund Corporation)

(4) Heat treatment method: Surfusing (Nippon Pneumatic Mfg. Co., Ltd.)

(5) Others: spray dry (OHKAWARA KAKOHKI CO., LTD.)

[Developer]

The electrostatic image developer according to the present invention includes at least the toner for developing an electrostatic image according to the present invention.

The electrostatic image developer may be a mono-component developer containing only the toner for developing an electrostatic image, or a two-component developer in which the toner for developing an electrostatic image is mixed with a carrier.

(Carrier)

One of main roles of the carrier included in the two-component developer is to be stirred and mixed with the toner in the developing box to provide the toner with a desired charge.

Another role of the carrier is to serve as an electrode between the developing machine and the photoreceptor and to function as a carrier substance (i.e., carrier) that transports the charged toner to an electrostatic latent image on the photoreceptor to form a toner image.

The carrier is held on the magnet roller by, for example, a magnetic force, acts on development, then returns to the developing box again, is stirred and mixed with new toner again, and is repeatedly used for a certain period.

Therefore, in order to stably maintain desired image characteristics (image density, fogging, white spots, gradation, resolving power, and the like), it is naturally required that the characteristics of the carrier be stable during the period of use.

The carrier is not particularly limited, and examples thereof include known carriers. Examples of the carrier include coated carriers in which the surface of a core material formed of conductive particles or magnetic powder is coated with a coating resin, magnetic powder dispersion-type carriers in which magnetic powder is dispersed and blended in a matrix resin, and resin-impregnated carriers in which porous magnetic powder is impregnated with a resin.

Note that the magnetic powder-dispersed carrier and the resin-impregnated carrier may be a carrier in which constituent particles of the carrier are cores and which is coated with a coating resin.

Examples of the conductive particles include particles of metals such as gold, silver, and copper, carbon black, titanium oxide, zinc oxide, tin oxide, barium sulfate, aluminum borate, and potassium titanate.

Examples of the magnetic powder include magnetic metals such as iron, nickel, and cobalt, and magnetic oxides such as ferrite and magnetic.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid copolymer, a straight silicone resin containing an organosiloxane bond or a modified product thereof, a fluororesin, polyester, polycarbonate, a phenol resin, and an epoxy resin.

Note that the coating resin and the matrix resin may contain other additives such as a conductive material.

Here, in order to coat the surface of the core material with the coating resin, a method of coating with a coating layer forming solution in which the coating resin and, if necessary, various additives are dissolved in an appropriate solvent, and the like are exemplified.

The solvent is not particularly limited, and may be selected in consideration of the coating resin to be used, coating suitability, and the like.

Specific examples of the resin coating method include an immersion method in which the core material is immersed in the coating layer forming solution, a spray method in which the coating layer forming solution is sprayed on the surface of the core material, a fluidized bed method in which the coating layer forming solution is sprayed while the core material is floated by fluidized air, and a kneader coater method in which the core material of the carrier and the coating layer forming solution are mixed in a kneader coater and the solvent is removed.

The mixing ratio (weight ratio) between the toner and the carriers in the two-component developer is preferably toner: carrier=1:100 to 30:100, and more preferably 3:100 to 20:100.

4. Image Forming System

The "image forming system" of the present invention refers to an assembly which is constituted by devices or apparatuses having predetermined functions as means and elements necessary for each step of image formation, a toner for developing an electrostatic image, and the like, and which performs the function of image formation as a whole. It is to be noted that the respective means and elements may be individually disposed at different places apart from each other, or may be collectively disposed in a certain space as one device to be integrally formed as a system device.

The present invention particularly provides an image forming system including: a photoreceptor including a photosensitive layer formed on an aluminum substrate; a means that develops a latent image formed on the photoreceptor with a toner for developing an electrostatic image; a means that transfers a toner image on the photoreceptor to a transfer-receiving body; and the toner for developing an electrostatic image, wherein the aluminum substrate contains silicon, a silicon content of the aluminum substrate is more than 0.6% by mass, and a glass transition point (Tg) of the toner for developing an electrostatic image is in a range of 0 to 45° C.

The image forming system of the present invention is a system for forming an image using the photoreceptor, the developing means, the transferring means, the cleaning means, and the toner for developing an electrostatic image. Hereinafter, for the convenience of description, an apparatus section including a photoreceptor, a developing means, a transferring means and a cleaning means is particularly referred to as an "electrophotographic image forming apparatus".

As long as the image forming system of the present invention is a system of a form or mode in which an image is formed using a photoreceptor formed on a support containing aluminum having a silicon content within the specific range as a main component, a developing means, a transferring means, and a cleaning means, and a toner for developing a charge image satisfying the conditions of the specific shape factor and particle size of the toner particles, each unit constituting the electrophotographic image forming apparatus is not limited. That is, the apparatus used in the present invention is not particularly limited as long as it is an apparatus satisfying the above-described conditions, and it is not always necessary to use an electrophotographic image forming apparatus dedicated to the toner for developing a charge image satisfying the specific conditions according to the present invention.

Further, the image forming system of the present invention is also preferably provided with a means that records and stores recording and copying information as electronic data and a means that wirelessly communicates the electronic data. For example, a wireless interface for transmitting and receiving data to and from the information processing device by wireless communication such as Bluetooth® or Wi-Fi® is preferably provided.

A typical electrophotographic image forming apparatus that can be used in the present invention is described below. The electrophotographic image forming apparatus is also simply referred to as an "image forming apparatus".

The image forming apparatus includes the photoreceptor, a developing means, a transferring means, and a cleaning means. The image forming apparatus preferably includes a charging means (first charging means) and an exposure means. Furthermore, the image forming apparatus may include a second charging means between the transferring means and the cleaning means.

Figure 6:
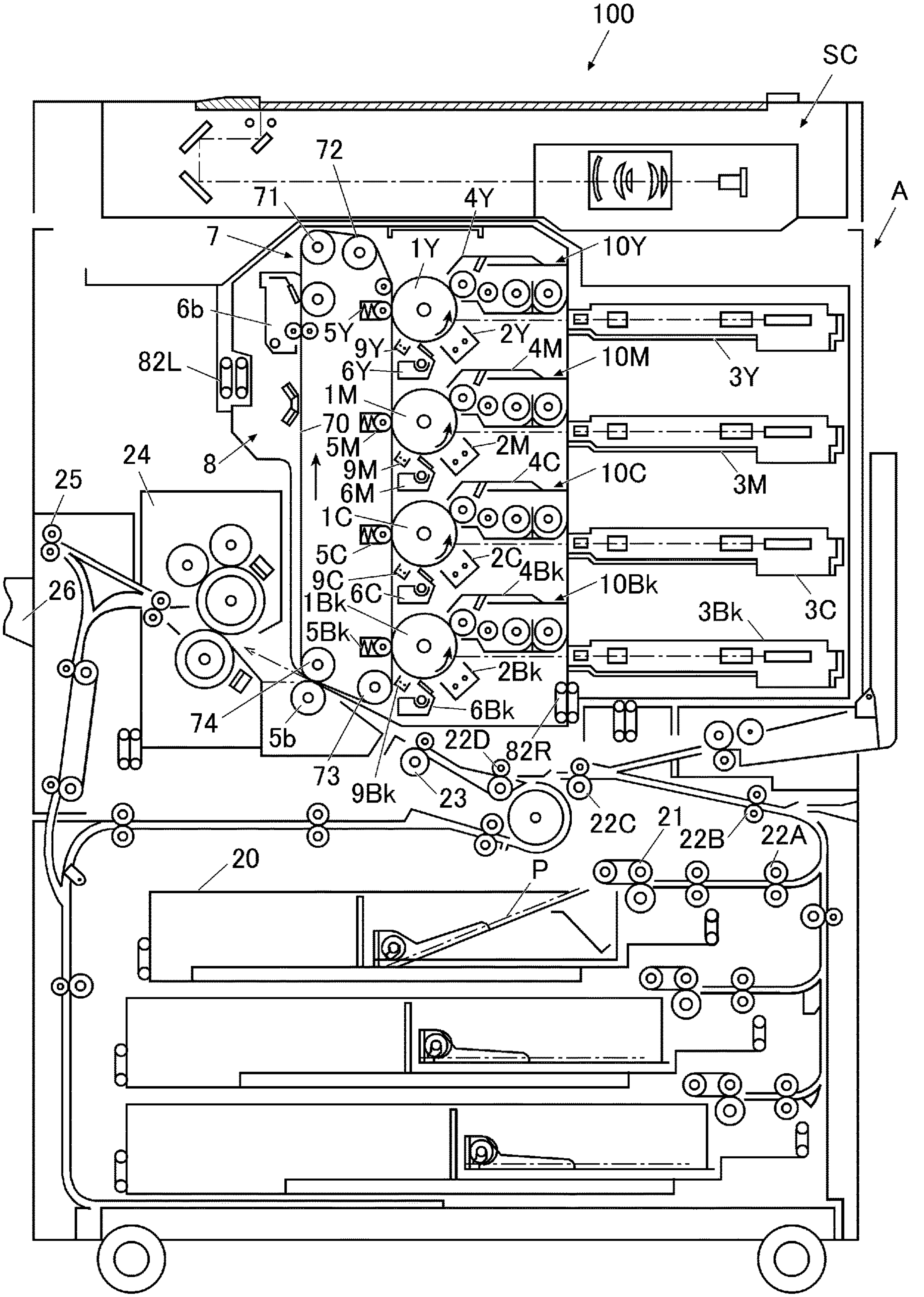
FIG. 6 is a schematic configurational view illustrating an example of the image forming apparatus according to the present invention.

FIG. 6 is a schematic configurational view illustrating an example of the image forming apparatus according to the present invention. The image forming apparatus 100 is called a tandem-type color image forming apparatus. The image forming apparatus 100 includes four sets of process cartridges 10Y, 10M, 10C, and 10Bk, an intermediate transfer member unit 7, a sheet feed means 21, a fixing means 24, and the like. At an upper part of an apparatus main body A of the image forming apparatus 100, a document image reading device SC is arranged.

The process cartridge 10Y that forms a yellow image includes, around a drum-shaped photoreceptor 1Y, a first charging means 2Y, an exposure means 3Y, a developing means 4Y, a primary transfer roller 5Y, a second charging means 9Y, and a cleaning means 6Y, which are sequentially arranged along a rotation direction of the photoreceptor 1Y.

The process cartridge 10M for forming a magenta image includes, around a drum-shaped photoreceptor 1M, a first charging means 2M, an exposure means 3M, a developing means 4M, a primary transfer roller 5M, a second charging means 9M, and a cleaning means 6M, which are sequentially arranged along a rotation direction of the photoreceptor 1M.

The process cartridge 10C for forming a cyan image includes, around a drum-shaped photoreceptor 1C, a first charging means 2C, an exposure means 3C, a developing means 4C, a primary transfer roller 5C, a second charging means 9C, and a cleaning means 6C, which are sequentially arranged along a rotation direction of the photoreceptor 1C.

The process cartridge 10Bk that forms a black image includes, around a drum-shaped photoreceptor 1Bk, a first charging means 2Bk, an exposure means 3Bk, a developing means 4Bk, a primary transfer roller 5Bk, a second charging means 9Bk, and a cleaning means 6Bk, which are sequentially arranged along a rotation direction of the photoreceptor 1Bk.

As the photoreceptors 1Y, 1M, 1C, and 1Bk, the above-described electrophotographic photoreceptor of the present invention is used.

The process cartridges 10Y, 10M, 10C, and 10Bk are configured in the same manner except that the colors of the toner images formed on the photoreceptors 1Y, 1M, 1C, and 1Bk are different. Thus, the process cartridge 10Y will be described in detail as an example, and the description of the process cartridges 10M, 1° C. and 10Bk will be omitted.

The process cartridge 10Y includes, around a photoreceptor 1Y serving as an image forming member, a first charging means 2Y, an exposure means 3Y, a developing means 4Y, a primary transfer roller 5Y, a second charging means 9Y, and a cleaning means 6Y, and forms a yellow (Y) toner image on the photoreceptor 1Y. The process cartridge 10Y may be detachable from the image forming apparatus 100. Furthermore, in the present embodiment, of the process cartridges 10Y, at least the photoreceptor 1Y, the first charging means 2Y, the developing means 4Y, the second charging means 9Y, and the cleaning means 6Y are provided integrally.

The first charging means 2Y is a means that provides a uniform potential to the photoreceptor 1Y, and for example, a corona discharge-type charging device is used.

The exposure means 3Y is a means that performs exposure, based on the image signal (yellow), on the photoreceptor 1Y to which the uniform potential has been applied by the first charging means 2Y, to form an electrostatic latent image corresponding to a yellow image. As the exposure means 3Y, for example, exposure means including LEDs in which light emitting elements are arranged in an array in the axial direction of the photoreceptor 1Y and image forming elements, or exposure means of a laser optical system is used.

The developing means 4Y includes, for example, a developing sleeve which contains a magnet, holds a developer, and rotates, and a voltage application device which applies a DC and/or AC bias voltage between the photoreceptor 1Y and the developing sleeve.

The primary transfer roller 5Y is a means that transfers the toner image formed on the photoreceptor 1Y to an intermediate transfer member 70 in the form of an endless belt. The primary transfer roller 5Y is disposed in contact with the intermediate transfer member 70.

The second charging means 9Y is a discharging means that charges (discharges) the surfaces of the photoreceptor 1Y after the toner images are transferred to the intermediate transfer member 70, and is provided as a pre-cleaning member. As the second charging means 9Y, for example, a corona discharge type charging device is used.

The cleaning means 6Y is composed of a cleaning blade and a brush roller provided on the upstream side from the cleaning blade.

The intermediate transfer member unit 7 includes an endless belt-shaped intermediate transfer member 70. The intermediate transfer member 70 is a second image bearing member in the form of a semiconductive endless belt wound around and rotatably supported by a plurality of rollers 71, 72, 73 and 74.

In the intermediate transfer member unit 7, a cleaning means 6*b* that removes the toner is provided on the intermediate transfer member 70.

Furthermore, a housing 8 is constituted by the process cartridges 10Y, 10M, 10C and 10Bk and the intermediate transfer member unit 7. The housing 8 is configured to be drawable from the apparatus main body A via support rails 82L and 82R.

The image forming apparatus 100 includes a secondary transfer roller 5*b* that transfers a color image formed on the intermediate transfer member 70 to a transfer material P. The sheet feed section 21 is a means that supplies the transfer material P to the secondary transfer roller 5*b*. The sheet feed section 21 includes a sheet feed cassette 20 that stores the transfer material P, and a plurality of intermediate rollers 22A, 22B, 22C, 22D, and a registration roller 23 for conveying the transfer material P to the secondary transfer roller 5*b*.

The fixing means 24 is a means that fixes the color image transferred to the transfer material P to the transfer material P. Examples of the fixing means 24 include those of a heat roller fixing type. Such a fixing means 24 is composed of, for example, a heating roller internally provided with a heat source and a pressure roller provided in a state of being pressed against the heating roller so as to form a fixing nip part. The image forming apparatus 100 has a sheet ejection tray 26 for taking out the transfer material P on which the image has been formed. Furthermore, the image forming apparatus 100 includes, on the downstream of the fixing section 24, sheet ejection rollers 25 that convey the fixed transfer material P to a sheet ejection tray 26.

Note that the image forming apparatus 100 is a color laser printer in the embodiment described above, but is not limited to this. For example, the image forming apparatus may be a monochrome laser printer, a copier, a multifunction apparatus, or the like. Furthermore, the exposure light source may be a light source other than a laser, for example, an LED light source.

Using the above-described image forming apparatus, an image can be formed as follows.

In the charging step (first charging step), the surfaces of the first charging means 2Y, 2M, 2C, and 2Bk are negatively charged by being discharged by the photoreceptors 1Y, 1M, 1C, and 1Bk.

In the exposure step, the surfaces of the photoreceptors 1Y, 1M, 1C, and 1Bk are exposed to light based on image signals by the exposure means 3Y, 3M, 3C, and 3Bk to form electrostatic latent images.

In the developing step, toners are applied to the surfaces of the photoreceptors 1Y, 1M, 1C, and 1Bk, and developed by the developing means 4Y, 4M, 4C, and 4Bk to form toner images.

In the transferring step, the toner images of the respective colors formed on the photoreceptors 1Y, 1M, 1C, and 1Bk were sequentially transferred (primary transferred) by the primary transfer rollers 5Y, 5M, 5C, and 5Bk onto the rotating intermediate transfer member 70. Then, a color image is formed on the intermediate transfer member 70.

In the second charging step, the surfaces of the photoreceptors 1Y, 1M, 1C, and 1Bk are neutralized by the second charging means 9Y, 9M, 9C, and 9Bk.

In the cleaning step, toner remaining on the surfaces of the photoreceptors 1Y, 1M, 1C, and 1Bk is removed by the cleaning means 6Y, 6M, 6C, and 6Bk. Then, in preparation for the next image forming process, the photoreceptors 1Y, 1M, 1C, and 1Bk are negatively charged by the charging means 2Y, 2M, 2C, and 2Bk.

On the other hand, a transfer material P is fed from the sheet feed cassette 20 by the sheet feed means 21 and is conveyed to the secondary transfer roller 5*b* via a plurality of intermediate rollers 22A, 22B, 22C, 22D and a registration roller 23. Then, the color image is transferred (secondary transferred) onto a transfer material P by a secondary transfer roller 5*b*.

The transfer material P on which the color image has been transferred in this way is subjected to fixing processing by the fixing means 24, then ejected to the outside of the apparatus by sandwiching it between the sheet ejection rollers 25, and placed on the sheet ejection tray 26. After the transfer material P is separated from the intermediate transfer member 70, the residual toner on the intermediate transfer member 70 is removed by the cleaning means 6*b*.

As described above, an image can be formed on the transfer material P.

EXAMPLES

Hereinafter, the present invention will be specifically described by way of Examples, but the present invention is not limited thereto. Note that in the following Examples, operations were performed at room temperature (25° C.) unless otherwise specified. Further, unless otherwise specified, "%" and "part(s)" mean "% by mass" and "part(s) by mass", respectively.

<Production of Photoreceptor 1>

(1) Preparation of Photoreceptor Support

A support 1 (outer diameter φ30 mm, length 360 mm) composed of the composition shown in Table I was prepared.

(2) Formation of Intermediate Layer

The following materials were mixed and dispersed to prepare an application liquid for an intermediate layer. At this time, a sand mill was used as a dispersing machine, and the dispersion was performed batchwise for 10 hours.

| | |
|---|---|
| Polyamide resin | 1.0 parts by mass |
| Titanium oxide | 1.1 parts by mass |
| Ethanol | 20 parts by mass |

As the polyamide resin (resin binder), X1010 (manufactured by Daicel-Evonik Ltd.) was used. As the titanium dioxide (conductive particles), SMT500SAS (manufactured by Tayca Corporation) was used. The number average primary particle size of the titanium oxide was 0.035 μm.

The application liquid was applied to the surface of the support by a dip coating method. Next, this was dried in an oven at 110° C. for 20 minutes. Thus, a 3 μm-thick intermediate layer was formed.

(3) Formation of Charge Generation Layer

The following materials were mixed and dispersed with a circulation type ultrasonic homogenizer "RUS-600TCVP (manufactured by NISSEI Corporation)" to prepare an application liquid for a charge generation layer. The dispersion conditions were 19.5 kHz, 600 W circulating flow rate of 40 L/H, and 0.5 hours.

| | |
|---|---|
| Charge generation compound | 24 parts by mass |
| Polyvinyl butyral resin | 12 parts by mass |
| Mixed solvent | 400 parts by mass |

As the charge generation compound, a mixed crystal of a 1:1 addition product of titanyl phthalocyanine having clear peaks at 8.3°, 24.7°, 25.10 and 26.5° by Cu-Kc characteristic X-ray diffraction spectrum measurement and (2R,3R)-2,3-butanediol, and non-added titanyl phthalocyanine was used. As the polyvinyl butyral resin, S-LEC BL-1 (manufactured by Sekisui Chemical Co., Ltd., "S-LEC" is a registered trademark of the company) was used. As the mixed solvent, 3-methyl-2-butanone:cyclohexanon=4:1 (volumetric ratio) was used.

The application liquid was applied to the surface of the intermediate layer by a dip coating method and dried. Thus, a charge generation layer having a thickness of 0.3 μm was formed.

(4) Formation of Charge Transport Layer

The following materials were mixed and dissolved to prepare an application liquid for a charge transport layer.

| | |
|---|---|
| Charge transport compound (CTM-48) | 75 parts by mass |
| Polycarbonate | 100 parts by mass |
| Antioxidant | 4 parts by mass |

As the polycarbonate, Z300 (bisphenol Z type polycarbonate, manufactured by Mitsubishi Gas Chemical Company, Inc.) was used. As the antioxidant, IRGANOX1010 (manufactured by Basf SE, "IRGANOX" is a registered trademark of the company).

The application liquid was applied to the surface of the charge generation layer by dip coating method. Next, this was dried at 120° C. for 70 minutes. Thus, a 24 μm-thick charge transport layer was formed.

<Production of Photoreceptors 2 to 5>

Photoreceptors 2 to 5 were produced in the same manner as in the production of the photoreceptor 1, except that the support used was changed to each of supports 2 to 10 having the compositions listed in the following Table I.

TABLE I

[% BY MASS]

| SUPPORT NO. | Si | Al | Fe | Cu | Mn | Mg | Cr | Zn | Ti |
|---|---|---|---|---|---|---|---|---|---|
| 1 | 0.61 | 97.59 | 0.3 | 0.1 | 1 | 0.2 | 0.1 | 0 | 0.1 |
| 2 | 3 | 94.9 | 0.3 | 0.2 | 1 | 0.4 | 0 | 0.1 | 0.1 |
| 3 | 19.5 | 78.8 | 0.3 | 0.1 | 1 | 0.1 | 0 | 0.1 | 0.1 |
| 4 | 20.5 | 77.5 | 0.3 | 0.2 | 1 | 0.3 | 0 | 0.1 | 0.1 |
| 5 | 0.5 | 97.7 | 0.3 | 0.2 | 1 | 0.1 | 0.1 | 0 | 0.1 |

<Production of Photoreceptor 6>

A support 6 (outer diameter φ30 mm, length 360 mm) made of a titanium-based alloy (DATS, manufactured by Daido Steel Co., Ltd.) having higher resistance than aluminum alloys was produced as the support used in the production of the photoreceptor 1. Except this, a photoreceptor 6 was produced in the same manner as in the photoreceptor 1.

<Production of Toner>

(Synthesis of Amorphous Polyester 1 (APEs-1))

| | |
|---|---|
| Bisphenol A ethylene oxide adduct | 30 parts by mass |
| Bisphenol A propylene oxide adduct | 270 parts by mass |
| Terephthalic acid | 60 parts by mass |
| Fumaric acid | 40 parts by mass |
| Tetrapropenylsuccinic anhydride | 40 parts by mass |

The above-described monomer components were charged into a reaction vessel equipped with a stiffer, a thermometer, a condenser and a nitrogen gas introduction tube, and the atmosphere in the reaction vessel was replaced by dry nitrogen gas. Thereafter, tin dioctanoate was charged in an amount of 0.3% with respect to the total amount of the monomer components. Under a nitrogen gas flow, the temperature was raised to 235° C. over 1 hour, and the mixture was reacted for 3 hours. The pressure inside of the reaction vessel was reduced to 10.0 mmHg, the mixture was allowed to react with stirring, and the reaction was terminated when the required molecular weight was reached to obtain an amorphous polyester 1.

(Preparation of Amorphous Polyester Dispersion 1)

| | |
|---|---|
| APEs-1 | 100 parts by mass |
| Methyl ethyl ketone | 60 parts by mass |
| Isopropyl alcohol | 10 parts by mass |

The above components were charged into a reaction vessel equipped with a stirrer and dissolved at 60° C. After confirmation of dissolution, the reaction vessel was cooled to 35° C., and then 3.5 parts by mass of 10% aqueous ammonia solution was added. Next, 300 parts of ion-exchanged water was added dropwise to the reaction vessel over 3 hours to prepare a polyester dispersion. Next, methyl ethyl ketone and isopropyl alcohol were removed by an evaporator to obtain an amorphous polyester dispersion 1.

(Synthesis of Amorphous Polyester 2 (APEs-2))

An amorphous polyester 2 was obtained in the same manner as in the synthesis of the amorphous polyester 1 except that the following monomer components were charged.

| | |
|---|---|
| Bisphenol A ethylene oxide adduct | 210 parts by mass |
| Bisphenol A propylene oxide adduct | 230 parts by mass |
| Terephthalic acid | 30 parts by mass |
| Fumaric acid | 135 parts by mass |
| Tetrapropenylsuccinic anhydride | 40 parts by mass |

(Preparation of Amorphous Polyester Dispersion 2)

An amorphous polyester dispersion 2 was prepared in the same manner as the amorphous polyester dispersion 1 except that the amorphous polyester used was changed to APEs-2.

(Synthesis of Amorphous Polyester 3 (APEs-3))

An amorphous polyester 3 was obtained in the same manner as in the synthesis of the amorphous polyester 1 except that the following monomer components were charged.

| | |
|---|---|
| Ethylene glycol | 106 parts by mass |
| Dimethyl terephthalate | 245 parts by mass |
| 1,10-Decanedicarboxylic acid | 105 parts by mass |

(Preparation of Amorphous Polyester Dispersion 3)

An amorphous polyester dispersion 3 was prepared in the same manner as the amorphous polyester dispersion 1 except that the amorphous polyester used was changed to APEs-3.

(Synthesis of Amorphous Polyester 4 (APEs-4))

An amorphous polyester 4 was obtained in the same manner as in the synthesis of the amorphous polyester 1 except that the following monomer components were charged.

| | |
|---|---|
| Bisphenol A ethylene oxide adduct | 150 parts by mass |
| Bisphenol A propylene oxide adduct | 250 parts by mass |
| Terephthalic acid | 100 parts by mass |
| Tetrapropenylsuccinic anhydride | 130 parts by mass |
| Trimellitic acid | 15 parts by mass |

(Preparation of Amorphous Polyester Dispersion 4)

An amorphous polyester dispersion 4 was prepared in the same manner as the amorphous polyester dispersion 1 except that the amorphous polyester used was changed to APEs-4.

(Synthesis of Amorphous Polyester 5 (APEs-5))

An amorphous polyester 5 was obtained in the same manner as in the synthesis of the amorphous polyester 1 except that the following monomer components were charged.

| | |
|---|---|
| Bisphenol A propylene oxide adduct | 350 parts by mass |
| Terephthalic acid | 35 parts by mass |
| Fumaric acid | 90 parts by mass |
| Tetrapropenylsuccinic anhydride | 13 parts by mass |

(Preparation of Amorphous Polyester Dispersion 5)

An amorphous polyester dispersion 5 was prepared in the same manner as the amorphous polyester dispersion 1 except that the amorphous polyester used was changed to APEs-5.

(Synthesis of Amorphous Polyester 6 (APEs-6))

| | |
|---|---|
| Fumaric acid | 54.3 parts by mass |
| Propylene oxide adduct of bisphenol A (BPA-PO) | 22.0 parts by mass |
| Dipropanol | 23.8 parts by mass |
| Tin 2-ethylhexanoate (esterification catalyst) | 0.5 parts by mass |

The above-described materials were weighed in a reaction tank equipped with a cooling tube, a stirrer, a nitrogen introduction tube, and a thermocouple. After replacing the inside of the reaction tank with nitrogen gas, the temperature was gradually raised while stirring, and the above materials were reacted over 3 hours while stirring at a temperature of 140° C.

Next, the pressure in the reaction tank was reduced to 8.3 kPa, the temperature was raised to 200° C. with stirring, and the mixture was reacted for 4 hours.

Thereafter, the pressure in the reaction tank was reduced again to 5 kPa or less, and the mixture was reacted at 200° C. for 3 hours to obtain an amorphous polyester 6.

(Preparation of Amorphous Polyester Dispersion 6)

An amorphous polyester dispersion 6 was prepared in the same manner as the amorphous polyester dispersion 1 except that the amorphous polyester used was changed to APEs-6.

(Synthesis of Amorphous Polyester 7 (APEs-7))

The following starting monomers of a vinyl polymerization segment (StAc segment) including a bireactive monomer and a radical polymerization initiator were placed in a dropping funnel.

| | |
|---|---|
| Styrene | 80 parts by mass |
| n-Butyl acrylate | 20 parts by mass |
| Acrylic acid | 10 parts by mass |
| Radical polymerization initiator (di-t-butyl peroxide) | 16 parts by mass |

In addition, the following starting monomers of an amorphous polyester polymerization segment (APEs segment) were placed in a four-necked flask equipped with a nitrogen introduction tube, a dewatering tube, a stirrer, and a thermocouple, and heated to 170° C. to be dissolved.

| | |
|---|---|
| Bisphenol A propylene oxide 2 mol adduct (BPA-PO) | 228.6 parts by mass |
| Bisphenol A ethylene oxide 2 mol adduct (BPA-EO) | 57.1 parts by mass |
| Terephthalic acid | 66.9 parts by mass |
| Fumaric acid | 47.4 parts by mass |

Next, the starting monomers of the vinyl polymerization segment were added dropwise over 90 minutes under stirring, and aging was performed for 60 minutes. Thereafter, the unreacted starting monomers of the vinyl polymerization segment were removed under reduced pressure (8 kPa).

Thereafter, 0.4 parts by mass of $Ti(O\text{-}n\text{-}Bu)_4$ was added as an esterification catalyst, the temperature was raised to 235° C., and the mixture was reacted under atmospheric pressure (101.3 kPa) for 5 hours and further reacted under reduced pressure (8 kPa) for 1 hour.

Next, after cooling to 200° C., a reaction was performed under reduced pressure (20 kPa) until a desired softening point was reached. Next, the solvent was removed to obtain an amorphous polyester 7.

(Preparation of Amorphous Polyester Dispersion 7)

100 parts by mass of the obtained amorphous polyester 7 was dissolved in 400 parts by mass of ethyl acetate (manufactured by Kanto Chemical Co., Inc.). This was further mixed with 638 parts by mass of a previously-produced solution of sodium lauryl sulfate having a concentration of 0.26% by mass and subjected to ultrasonic dispersion with an ultrasonic homogenizer "US-150T" (manufactured by NISSEI Corporation) at V-LEVEL 300 μA for 30 minutes while stirring.

Thereafter, ethyl acetate was completely removed while stirring for 3 hours under reduced pressure using a diaphragm vacuum pump "V-700" (manufactured by Buchi Labortechnik GmbH) in a state of being heated to 40° C., and thus amorphous polyester dispersion 7 was prepared.

(Synthesis of Crystalline Polyester 1 (CPEs-1))

| | |
|---|---|
| 1,10-Decanedicarboxylic acid | 300 parts by mass |
| Ethylene glycol | 100 parts by mass |

The above-described monomer components were charged into a reaction vessel equipped with a stirrer, a thermometer, a condenser and a nitrogen gas introduction tube, and the atmosphere in the reaction vessel was replaced by dry nitrogen gas. Thereafter, tin dioctanoate was charged in an amount of 0.3 parts by mass relative to 100 parts by mass of the monomer components.

After stirring and reacting under a nitrogen gas flow, at 160° C. for 3 hours, the temperature was further raised to 180° C. over 1.5 hours, and the pressure in the reaction vessel was reduced to 3 kPa. When a desired molecular weight was obtained, the reaction was terminated to obtain a crystalline polyester 1.

(Preparation of Crystalline Polyester Dispersion 1)

| | |
|---|---|
| CPEs-1 | 100 parts by mass |
| Methyl ethyl ketone | 60 parts by mass |
| Isopropyl alcohol | 15 parts by mass |

The above components were introduced into a reaction vessel equipped with a stiffer and dissolved at 65° C., and dissolution was confirmed. Thereafter, the reaction vessel was cooled to 60° C., and then 5 parts by mass of a 10% aqueous ammonia solution was added.

Next, 300 parts of ion-exchanged water was added dropwise to the reaction vessel over 3 hours to produce a polyester dispersion. Next, methyl ethyl ketone and isopropyl alcohol were removed by an evaporator to obtain a crystalline polyester dispersion 1.

(Synthesis of Crystalline Polyester 2 (CPEs-2))

A crystalline polyester 2 was obtained in the same manner as in the synthesis of the crystalline polyester 1 except that the following monomer components were charged.

| | |
|---|---|
| 1,10-Decanedicarboxylic acid | 350 parts by mass |
| 1,6-Hexanediol | 170 parts by mass |

(Preparation of Crystalline Polyester Dispersion 2)

A crystalline polyester dispersion 2 was prepared in the same manner as the crystalline polyester dispersion 1 except that the crystalline polyester used was changed to CPEs-2.

(Synthesis of Crystalline Polyester 3 (CPEs-3))

A crystalline polyester 3 was obtained in the same manner as in the synthesis of crystalline polyester 1 except that the following monomer components were charged.

| | |
|---|---|
| 1,10-Decanedicarboxylic acid | 350 parts by mass |
| 1,9-Nonanediol | 240 parts by mass |

(Preparation of Crystalline Polyester Dispersion 3)

A crystalline polyester dispersion 3 was prepared in the same manner as the crystalline polyester dispersion 1 except that the crystalline polyester used was changed to CPEs-3.

(Synthesis of Crystalline Polyester 4)

The following starting monomers of a vinyl polymerization segment (styrene-acrylic polymerization segment, StAc segment) including a bireactive monomer and a radical polymerization initiator were placed in a dropping funnel.

| | |
|---|---|
| n-Butyl acrylate | 12 parts by mass |
| Acrylic acid | 2 parts by mass |
| Radical polymerization initiator (di-t-butyl peroxide) | 7 parts by mass |

In addition, the following starting monomers of a crystalline polyester polymerization segment (CPEs segment) were placed in a four-necked flask equipped with a nitrogen introduction tube, a dewatering tube, a stirrer, and a thermocouple, and heated to 170° C. to be dissolved.

| | |
|---|---|
| Ethylene glycol | 106 parts by mass |
| Dimethyl terephthalate | 245 parts by mass |
| 1,10-Decanedicarboxylic acid | 105 parts by mass |

Next, the starting monomers of the vinyl polymerization segment were added dropwise over 90 minutes under stirring, and aging was performed for 60 minutes. Thereafter, the unreacted starting monomers of the vinyl polymerization segment were removed under reduced pressure (8 kPa). Note that the amount of the monomer removed at this time was an extremely small amount as compared with the amount of the monomer of the vinyl polymerization segment.

Thereafter, 0.8 parts by mass of $Ti(O\text{-}n\text{-}Bu)_4$ was added as an esterification catalyst, the temperature was raised to 235° C., and the mixture was reacted under atmospheric pressure (101.3 kPa) for 5 hours and further reacted under reduced pressure (8 kPa) for 1 hour.

Next, after cooling to 200° C., the mixture was reacted for 1 hour under reduced pressure (20 kPa) to obtain a crystalline polyester 4 which is a hybrid crystalline polyester.

(Preparation of Crystalline Polyester Dispersion 4)

The crystalline polyester 4 (30 parts by mass) was melted and transferred in a molten state to an emulsifying disperser "CAVITRON CD1010" (manufactured by Eurotec Co., Ltd.) at a transfer rate of 100 parts by mass per minute.

At the same time as the transfer of this crystalline polyester in this molten state, a dilute ammonia water having a concentration of 0.37% by mass obtained by diluting 70 parts by mass of a reagent ammonia water with an ion-exchanged water in a separate aqueous solvent tank was transferred to the emulsifying disperser at a transfer rate of 0.1 L per minute while heating to 100° C. with a heat exchanger.

Then, the emulsifying disperser was operated under conditions of the rotor rotation speed of 60 Hz and the pressure of 5 kg/cm$^2$ to prepare a crystalline polyester dispersion 4.

(Preparation of Styrene-Acrylic Copolymer Resin Dispersion 1)

| | |
|---|---|
| Styrene | 126 parts by mass |
| n-Butyl acrylate | 14 parts by mass |
| Dodecanethiol | 2.1 parts by mass |
| Isopropyl alcohol | 0.88 parts by mass |
| Anionic surfactant (Dowfax, manufactured by The Dow Chemical Company) | 4 parts by mass |
| Ion-exchanged water | 59.2 parts by mass |

The above components were charged into a vessel and emulsified using a homogenizer to produce a monomer emulsion A.

On the other hand, the following components were charged into a reaction vessel for polymerization, a reflux tube was installed, the mixture was slowly stirred while injecting nitrogen, and the flask for polymerization was heated to 75° C. in a water bath and held. Into this vessel, 10 parts by mass of the above monomer emulsion A was added dropwise over 10 minutes using a metering pump.

| | |
|---|---|
| Ion-exchanged water | 133 parts by mass |
| Anionic surfactant (Dowfax, manufactured by Dow Chemical Company) | 0.6 parts by mass |

Then, 1.05 parts of ammonium persulfate was dissolved in 10 parts by mass of ion-exchanged water, and the solution was added dropwise to the flask for polymerization over 10 minutes using a metering pump. Stirring was continued for 1 hour in this state.

Further, the remaining monomer emulsion A was added dropwise over 2 hours using a metering pump. After the completion of the addition, stirring was further continued for 3 hours to obtain styrene-acrylic copolymer resin dispersion 1 containing a styrene-acrylic copolymer resin (St/Ac1).

(Preparation of Styrene-Acrylic Copolymer Resin Dispersion 2)

(a) First Stage Polymerization (Preparation of Dispersion of Vinyl Resin Particles [d1])

Into a 5 L reaction vessel equipped with a stirrer, a temperature sensor, a cooling tube, and a nitrogen introduction device, 8 parts by mass of sodium dodecyl sulfate and 3000 parts by mass of ion-exchanged water were charged. Then, the internal temperature was raised to 80° C. with stirring at a rate of 230 rpm under a nitrogen gas flow. After the temperature rise, a solution prepared by dissolving 10 parts by mass of potassium persulfate in 200 parts by mass of ion-exchanged water was added, the liquid temperature was again set to 80° C., and a mixed solution of the following monomers was added dropwise over 1 hour.

| | |
|---|---|
| n-Butyl acrylate | 396 parts by mass |
| Methacrylic acid | 604 parts by mass |

After the dropwise addition, the mixture was heated and stirred at 80° C. for 2 hours to perform polymerization, thereby preparing a dispersion of vinyl resin particles [d1].

(b) Second Stage Polymerization

A solution prepared by dissolving 7 parts by mass of sodium dodecyl sulfate in 3000 parts by mass of ion-exchanged water was charged into a 5 L reaction vessel equipped with a stirring device, a temperature sensor, a cooling tube, and a nitrogen introduction device, and heated to 98° C. After the heating, the dispersion of the vinyl resin particles [d1] prepared by the first stage polymerization described above in an amount of 300 parts by mass on a solid basis and a mixed solution in which the following monomers, a chain transfer agent, and a release agent were dissolved at 90° C. were added.

| | |
|---|---|
| 2-Ethylhexyl acrylate | 90.5 parts by mass |
| Methacrylic acid | 33.1 parts by mass |
| n-Octyl mercaptan (chain transfer agent) | 5.5 parts by mass |
| Behenyl behenate (release agent, melting point 73° C.) | 130.0 parts by mass |

A mixing and dispersing treatment was performed for 1 hour with a mechanical disperser CLEARMIX (manufactured by M Technique Co., Ltd.) having a circulation path to prepare a dispersion containing emulsified particles (oil droplets). To this dispersion, a polymerization initiator solution prepared by dissolving 6 parts by mass of potassium persulfate in 200 parts by mass of ion-exchanged water was added. This system was heated and stirred at 78° C. for 1 hour for polymerization to prepare a dispersion of vinyl resin particles [d2].

(c) Third Stage Polymerization

To the dispersion of vinyl resin particles [d2] obtained by the second stage polymerization, 400 parts by mass of ion-exchanged water was further added and mixed well. Then, a solution prepared by dissolving 6.0 parts by mass of potassium persulfate in 400 parts by mass of ion-exchanged water was added. Furthermore, a mixed solution of the following monomers and a chain transfer agent was added dropwise over 1 hour under a temperature condition of 81° C.

| | |
|---|---|
| n-Butyl acrylate | 143.2 parts by mass |
| Methacrylic acid | 200.5 parts by mass |
| n-Octyl mercaptan (chain transfer agent) | 8.0 parts by mass |

After the completion of the dropwise addition, the mixture was heated and stirred for 2 hours to perform polymerization, and then cooled to 28° C., thereby obtaining styrene-acrylic copolymer resin dispersion 2.

(Preparation of Styrene-Acrylic Copolymer Resin Dispersion 3)

(a) First Stage Polymerization

An anionic surfactant solution in which 2.0 parts by mass of an anionic surfactant "sodium lauryl sulfate" had been dissolved in 2900 parts by mass of ion-exchanged water was charged into a reaction vessel equipped with a stirrer, a temperature sensor, a temperature controller, a cooling tube, and a nitrogen introduction device. The internal temperature was raised to 80° C. with stirring at a stirring rate of 230 rpm under a nitrogen gas flow.

To the surfactant solution, 9.0 parts by mass of a polymerization initiator "potassium persulfate: KPS" was added, and the internal temperature was set to 78° C. Thereafter, a solution (1) having the following composition was added dropwise over 3 hours.

After completion of the dropwise addition, the mixture was heated and stirred at 78° C. for 1 hour to perform polymerization (first stage polymerization), thereby preparing a "dispersion of resin particles [a1]".

Composition of Solution (1):

| | |
|---|---|
| Styrene | 540 parts by mass |
| n-Butyl acrylate | 270 parts by mass |
| Methacrylic acid | 65 parts by mass |
| n-Octyl mercaptan | 17 parts by mass |

(b) Second Stage Polymerization: Formation of Intermediate Layer

In a flask equipped with a stirrer, 55 parts by mass of paraffin wax (melting point: 73° C.) as a release agent was added to a solution (2)) having the following composition and dissolved by heating to 85° C. to prepare a monomer solution [2].

Composition of Solution (2):

| | |
|---|---|
| Styrene | 94 parts by mass |
| n-Butyl acrylate | 60 parts by mass |
| Methacrylic acid | 11 parts by mass |
| n-Octyl mercaptan | 5 parts by mass |

On the other hand, a surfactant solution prepared by dissolving 2 parts by mass of an anionic surfactant "sodium lauryl sulfate" in 1100 parts by mass of ion-exchanged water was heated to 90° C. To this surfactant solution, the "dispersion of resin particles [a1]" was added in an amount of 28 parts by mass on a solid basis of the resin particles [a1]. Thereafter, the monomer solution [2] was mixed and dispersed for 4 hours with a mechanical disperser "CLEARMIX" (manufactured by M Technique Co., Ltd.) having a circulation path to prepare a dispersion containing emulsified particles having a dispersed particle size of 350 nm.

To this dispersion, an initiator aqueous solution prepared by dissolving 2.5 parts by mass of a polymerization initiator "KPS" in 110 parts by mass of ion-exchanged water was added, and this system was heated and stirred at 90° C. for 2 hours. Thus, polymerization (second stage polymerization) was performed to prepare a "dispersion of resin particles [a11]".

(c) Third Stage Polymerization: Formation of Outer Layer

To the "dispersion of resin particles [a11]", an aqueous initiator solution prepared by dissolving 2.5 parts by mass of a polymerization initiator "KPS" in 110 parts by mass of ion-exchanged water was added, and under a temperature condition of 80° C., a solution (3) having the following composition was added dropwise over 1 hour.

Composition of Solution (3):

| | |
|---|---|
| Styrene | 230 parts by mass |
| n-Butyl acrylate | 100 parts by mass |
| n-Octyl mercaptan | 5.2 parts by mass |

After the completion of the dropwise addition, polymerization (third stage polymerization) was performed by heating and stirring over 3 hours. Thereafter, the mixture was cooled to 28° C. to prepare styrene-acrylic copolymer resin dispersion 3.

(Preparation of Release Agent Dispersion)

| | |
|---|---|
| Hydrocarbon-based wax (manufactured by Nippon Seiro Co., Ltd., trade name: FNP0090, melting temperature Tw = 90.2° C.) | 270 parts by mass |
| Anionic surfactant (TAYCA POWER BN2060, manufactured by Tayca Corporation, amount of active ingredient: 60%) | 13.5 parts by mass (as an active ingredient, 3.0% with respect to release agent) |
| Ion-exchanged water | 700 parts by mass |

The above components were mixed, and the release agent was dissolved at an internal liquid temperature of 120° C. using a pressure discharge-type homogenizer (Gaulin Homogenizer, manufactured by Gaulin). Thereafter, the mixture was dispersed at dispersion pressures of 5 MPa for 120 minutes and then 40 MPa for 360 minutes, and cooled to obtain a release agent dispersion. The volume-average particle size D50v of the particles in the release agent dispersion was 220 nm. Thereafter, ion-exchanged water was added to adjust the solid concentration to 20.0%.

(Preparation of Black Colorant Dispersion 1)

| | |
|---|---|
| Carbon black (manufactured by Cabot Corporation, REGAL330) | 200 parts by mass |
| Anionic surfactant (Neogen SC, manufactured by Dai-ichi Kogyo Seiyaku Co., Ltd.) | 33 parts by mass (60% active ingredient, 10% with respect to colorant) |
| Ion-exchanged water | 750 parts by mass |

The above components were loaded into a stainless steel vessel having a size such that a liquid level became ⅓ of a height of the vessel when all of the above components were loaded, then 280 parts by mass of ion-exchanged water and an anionic surfactant were placed, and the surfactant was sufficiently dissolved. Thereafter, all of the pigments were added, and the mixture was stirred with a stirrer until no unwetted pigment remained. Thereafter, the remaining ion-exchanged water was added, and the mixture was further stirred to be sufficiently defoamed.

After the defoaming, the mixture was dispersed with a homogenizer (ULTRA-TURRAX T50, manufactured by Ika-Werke GmbH & Co. KG) at 5000 rpm for 10 minutes, and then stirred with a stirrer for 24 hours to perform defoaming. After the defoaming, the mixture was dispersed again at 6000 rpm for 10 minutes using a homogenizer, and then stirred for 24 hours with a stirrer to perform defoaming.

After the defoaming, the mixture was dispersed at a pressure of 240 MPa using a high-pressure impact type dispersing machine Ultimizer (manufactured by Sugino Machine Limited, HJP30006). The dispersion was performed correspondingly to 25 passes based on the calculation from the total charged amount and the processing capacity of the apparatus.

The obtained dispersion was allowed to stand for 72 hours, the precipitate was removed, and ion-exchanged water was added to adjust the solid concentration to 15% to obtain a black colorant dispersion 1. The volume-average particle size D50v of the particles in the colorant dispersion was 110 nm.

(Preparation of Black Colorant Dispersion 2)

Ninety (90) parts by mass of sodium dodecyl sulfate was dissolved in 1600 parts by mass of ion-exchanged water with stirring. While this mixture was being stirred, 420 parts by mass of carbon black "Regal 330R" (manufactured by Cabot Corp.) was gradually added. Next, the mixture was subjected to dispersion treatment using a stirring apparatus "CLEARMIX" (manufactured by M Technique Co., Ltd.), thereby obtaining a black colorant dispersion 2. The volume-average particle size D50v of the particles in the colorant dispersion was 110 nm.

<Production of Toner Base Particles 1>

Each dispersion was weighed so as to have the following composition as the core portion of the toner base particles. The term "parts by mass" of the dispersion below indicates the number of parts of the solid content. In addition, the composition of the toner shown in the following Table II shows the content (% by mass) of each of APEs (amorphous polyester), CPEs (crystalline polyester), and St/Ac (styrene-acrylic resin) when the total mass of APEs, CPEs, and St/Ac is 100% by mass.

| | |
|---|---|
| (First APEs) APEs-1 | 23 parts by mass |
| (Second APEs) APEs-2 | 23 parts by mass |
| CPEs-1 | 20 parts by mass |
| St/Ac1 | 4 parts by mass |
| Black colorant dispersion 1 | 6.5 parts by mass |
| Release agent | 1.5 parts by mass |

After each dispersion was charged into a round stainless steel flask, ion-exchanged water was added so that the solid concentration was 12.5% by mass, and 6.3 parts by mass of a 10% aqueous aluminum sulfate solution was further charged. Next, the mixture was mixed and dispersed with a homogenizer (ULTRA-TURRAX T50, manufactured by Ika-Werke GmbH & Co. KG) at 5000 rpm for 10 minutes. Thereafter, the mixture in the flask was heated and stirred to 40° C. with stirring, and thereafter, the temperature was raised to 0.5° C. per minute, and then the temperature was maintained when the particle size reached 6.1 μm.

On the other hand, each dispersion was weighed and mixed so as to have the following composition as the shell portion of the toner base particles, and the mixed dispersion was charged and held for 60 minutes.

| | |
|---|---|
| APEs-5 | 10 parts by mass |
| APEs-6 | 9 parts by mass |
| Release agent | 3 parts by mass |

The obtained content was observed with an optical microscope, and it was confirmed that aggregated particles were generated. Then, 11 parts by mass of ethylenediaminetetraacetic acid (EDTA) tetrasodium salt (CHELEST 40, manufactured by Chelest Corporation) was added. Thereafter, an aqueous sodium hydroxide solution was added to adjust the pH to 8. The temperature was then increased 82.5° C., and then the pH was lowered by 0.05 per 10 minutes with nitric acid, and stirring was continued for 45 minutes. After cooling, the mixture was filtered, thoroughly washed with ion-exchanged water, and dried to obtain toner base particles 1.

<Production of Toner Base Particles 2>

Each dispersion was weighed so as to have the following composition as the core portion of the toner base particles.

| | |
|---|---|
| (First APEs) APEs-3 | 47 parts by mass |
| (Second APEs) | none |
| CPEs-1 | 22 parts by mass |
| St/Ac1 | none |
| Black colorant dispersion 1 | 6.5 parts by mass |
| Release agent | 1.5 parts by mass |

On the other hand, toner base particle 2 was obtained in the same manner as the toner base particles 1 except that each dispersion was weighed so as to have the following composition as the shell portion of the toner base particles.

| | |
|---|---|
| APEs-5 | 10 parts by mass |
| APEs-6 | 10 parts by mass |
| Release agent | 3 parts by mass |

<Production of Toner Base Particles 3>

Each dispersion was weighed so as to have the following composition as the core portion of the toner base particles.

| | |
|---|---|
| (First APEs) APEs-4 | 26 parts by mass |
| (Second APEs) APEs-5 | 26 parts by mass |
| CPEs-2 | 19 parts by mass |
| St/Ac1 | none |
| Black colorant dispersion 1 | 6.5 parts by mass |
| Release agent | 1.5 parts by mass |

On the other hand, toner base particles 3 were obtained in the same manner as the toner base particles 1 except that each dispersion was weighed so as to have the following composition as the shell portion of the toner base particles.

| | |
|---|---|
| APEs-5 | 9 parts by mass |
| APEs-6 | 9 parts by mass |
| Release agent | 3 parts by mass |

<Production of Toner Base Particles 7>

Each dispersion was weighed so as to have the following composition as the core portion of the toner base particles.

| | |
|---|---|
| (First APEs) APEs-3 | 47 parts by mass |
| (Second APEs) | none |
| SPEs-1 | 22.5 parts by mass |
| St/Ac1 | none |
| Black colorant dispersion 1 | 6.5 parts by mass |
| Release agent | 1.5 parts by mass |

On the other hand, toner base particles 7 were obtained in the same manner as the toner base particles 1 except that each dispersion was weighed so as to have the following composition as the shell portion of the toner base particles.

| | |
|---|---|
| APEs-5 | 10 parts by mass |
| APEs-6 | 10 parts by mass |
| Release agent | 3 parts by mass |

<Production of Toner Base Particles 8>

Each dispersion was weighed so as to have the following composition as the core portion of the toner base particles.

| | |
|---|---|
| (First APEs) APEs-4 | 26 parts by mass |
| (Second APEs) APEs-5 | 26 parts by mass |
| CPEs-2 | 16 parts by mass |
| St/Ac1 | none |
| Black colorant dispersion 1 | 6.5 parts by mass |
| Release agent | 1.5 parts by mass |

On the other hand, toner base particles 8 were obtained in the same manner as the toner base particles 1 except that each dispersion was weighed so as to have the following composition as the shell portion of the toner base particles.

| | |
|---|---|
| APEs-5 | 9 parts by mass |
| APEs-6 | 9 parts by mass |
| Release agent | 3 parts by mass |

<Production of Toner Base Particles 4>

(Synthesis of Amorphous Polyester)

| | |
|---|---|
| Terephthalic acid | 55.6 parts by mass |
| Propylene oxide adduct of bisphenol A (BPA-PO) | 28.8 parts by mass |
| Propanediol | 15.5 parts by mass |
| Tin 2-ethylhexanoate (esterification catalyst) | 0.50 parts by mass |

The above-described materials were charged into a reaction tank equipped with a cooling tube, a stirrer, a nitrogen introduction tube, and a thermocouple. Thereafter, the inside of the reaction tank was replaced with nitrogen gas, the temperature was gradually raised while stirring, and the above materials were reacted over 3 hours while stirring at a temperature of 140° C.

Next, the pressure in the reaction tank was reduced to 8.3 kPa, the temperature was raised to 200° C. with stirring, and the mixture was reacted for 4 hours. Thereafter, the pressure in the reaction tank was reduced again to 5 kPa or less, and the mixture was reacted at 200° C. for 3 hours to obtain an amorphous polyester as a binding resin.

| | |
|---|---|
| Amorphous polyester | 89 parts by mass |
| Hydrocarbon wax (Fischer-Tropsch wax) | 4.5 parts by mass |
| Carbon black (manufactured by Cabot Corporation, REGAL330) | 6.5 parts by mass |

The above materials were mixed using a Henschel mixer (FM-75 type, manufactured by Mitsui Mining Co., Ltd.) at a rotational speed of 20 $s^{-1}$ and a rotational time of 5 min.

Thereafter, the mixture was kneaded with a twin-screw kneader (PCM-30 type, manufactured by Ikegai Corporation) set at a temperature of 150° C. The obtained kneaded product was cooled and coarsely pulverized to 1 mm or less with a hammermill to obtain a coarsely pulverized product. The resulting coarsely pulverized product was finely pulverized with a mechanical pulverizer (T-250, manufactured by Turbo Kogyo Co., Ltd.). Furthermore, classification was performed with Faculty F-300 (manufactured by Hosokawa Micron Corporation). The operating conditions of the Faculty F-300 were such that the classifying rotor rotational speed was 130 $s^{-1}$.

The classified particles were subjected to heat treatment by the surface treatment apparatus shown in FIG. 5. The operation conditions were as follows: feed amount=3 kg/hr, hot air temperature=150° C., hot air flow rate=6 $m^3$/min, cold air temperature=−5° C., cold air flow rate=4 $m^3$/min, blower flow rate=20 $m^3$/min, and injection air flow rate=1 $m^3$/min. Heat treatment was performed to obtain toner base particles 4 having an average particle size of 6.50 μm, average shape factor of 0.945 and a fine powder content of 17%.

<Production of Toner Base Particles 5>

The following materials and 2000 parts by mass of ion-exchanged water were charged into a reaction vessel equipped with a stirrer, a temperature sensor, and a cooling tube. Thereafter, 5 mol/liter of an aqueous sodium hydroxide solution was added to adjust the pH to 10 (25° C.).

| | |
|---|---|
| Styrene-acrylic copolymer resin dispersion 2 | 285 parts by mass (on a solid basis) |
| Crystalline polyester dispersion 4 | 40 parts by mass (on a solid basis) |

Dodecyl diphenyl ether sodium disulfonate (1% by mass (on a solid basis)) with respect to the total amount of vinyl resin and crystalline polyester)

Thereafter, 25.1 parts by mass (on a solid basis) of the black colorant dispersion 2 was added.

Then, an aqueous solution prepared by dissolving 60 parts by mass of magnesium chloride in 60 parts by mass of ion-exchanged water was added at 30° C. over 10 minutes under stirring.

Thereafter, the system was allowed to stand for 3 minutes, and then the temperature increase was started, and the system was heated to 80° C. over 60 minutes. After reaching 80° C., while the stirring speed was adjusted such that the growth rate of the particle size became 0.01 μm/min, the particle size of the associated particles was measured with “Coulter Multisizer 3” (manufactured by Beckman Coulter, Inc.), and the particles were grown until the volume-based median diameter became 6.1 μm.

Thereafter, 37 parts by mass (on a solid basis) of amorphous polyester dispersion 7 was introduced thereinto over 30 minutes, and when the supernatant of the reaction liquid became transparent, an aqueous solution in which 190 parts by mass of sodium chloride was dissolved in 760 parts by mass of ion-exchanged water was added thereto to stop the particle growth. Furthermore, the temperature was raised, and fusion of the particles was allowed to proceed by heating and stirring in a state of 80° C. The average circularity was measured using an apparatus “FPIA-3000” (manufactured by Sysmex Corporation) for measuring the average circularity of toner (the number of HPF detections was 4000), and when the average circularity reached 0.970, the particles were cooled to 30° C. at a cooling rate of 2.5° C./min.

Next, solid-liquid separation was performed, and then washing was performed by repeating three times the operation of re-dispersing the dehydrated toner cake in ion-exchanged water and performing solid-liquid separation. Thereafter, the resultant was dried at 40° C. for 24 hours to obtain toner base particles 5.

<Production of Toner Base Particles 6>

Into a reaction vessel equipped with a stirrer, a temperature sensor, and a cooling tube, 93.5 parts by mass on a solid basis of the styrene-acrylic copolymer resin dispersion 3, 6.5 parts by mass on a solid basis of black colorant dispersion 2, and 700 parts by mass ion-exchanged water were charged. Thereafter, 5 mol/liter of an aqueous sodium hydroxide solution was added to adjust the pH to 10 at 25° C.

Then, an aqueous solution prepared by dissolving 60 parts by mass of magnesium chloride in 60 parts by mass of ion-exchanged water was added at 30° C. over 10 minutes under stirring.

Thereafter, the system was allowed to stand for 3 minutes, then the temperature increase was started, the system was heated to 80° C. over 60 minute, and the particle growth reaction was continued while maintaining 80° C. In this state, the particle size of the associated particles was measured with “Coulter Multisizer 3” (manufactured by Beckman Coulter, Inc.), and when the volume-based median diameter (D50) reached 6.1 μm, an aqueous solution prepared by dissolving 190 parts by mass of sodium chloride in 760 parts by mass of ion-exchanged water was added to stop the particle growth.

Furthermore, the temperature was raised, and fusion of the particles was allowed to proceed by heating and stirring in a state of 90° C. Then, when the average circularity measured using an apparatus “FPIA-2100” (manufactured by Sysmex Corporation) for measuring the average circularity of toner (the number of HPF detections was 4000) reached 0.945, the particles were cooled to 30° C.

The obtained toner base particle dispersion 1 was subjected to solid-liquid separation with a centrifugal separator to form a wet cake of toner base particles. The wet cake was washed with ion-exchanged water at 35° C. in the centrifugal separator until the electric conductivity of the filtrate became 5 S/cm. Thereafter, the mixture was transferred to “Flash Jet Dryer” (manufactured by Seishin Enterprise Co., Ltd.), and dried until the water content reached 0.5% by mass to produce toner base particles 6.

<Production of Toner 1>

100 parts by mass of the toner base particles 1, 1.0 part by mass of hydrophobic silica fine particles (BET: 200 $m^2$/g) subjected to a hydrophobic treatment with hexamethyldisilazane, 1.0 part by mass of titanium oxide fine particles (BET: 80 $m^2$/g) subjected to a surface treatment with isobutyltrimethoxysilane, and 0.5 parts by mass of strontium titanate 1 were mixed using a Henschel mixer (Model FM-75, manufactured by Mitsui Miike Machinery Co., Ltd.) at a rotational speed of 30 $s^{-1}$ and a rotational time of 10 min to obtain toner 1.

<Production of Toners 2 to 8>

Toners 2 to 8 were produced as in the toner 1 except that the toner base particles 1 were replaced with toner base particles 2 to 8, respectively.

<Glass Transition Point>

The glass transition points of the obtained toners 1 to 8 were determined from the DSC curves obtained by differential scanning calorimetry (DSC) as described above.

[Evaluation]

(Transferability in High-Temperature and High-Humidity Environment)

As an electrophotographic image forming apparatus for evaluation, a commercially available electrophotographic image forming apparatus “AccurioPress C4080” (manufactured by Konica Minolta, Inc.) was used.

In a printing environment of a high-temperature and high-humidity environment (30° C., 80% RH), a character chart of 2% was copied on 20000 sheets. Thereafter, the maximum image density was measured by printing a solid image on A4 size high-quality paper (65 g/$m^2$) and measuring the relative reflection density based on the white paper density using a densitometer “RD-918” (manufactured by Macbeth). Those having the measured relative reflection density of 1.20 or higher were accepted.

(Low-Temperature Fixability)

For the evaluation of the low-temperature fixability, the fixing device of each actual machine used in actual printing was modified so that the fixing temperature was controlled to a “normal temperature −30° C.”.

Using Konica Minolta J paper as recording medium, a solid image (25 mm×25 mm) was formed and fixed.

The image surface of the fixed image after printing of 5000 sheets was valley-folded, the degree of peeling of the image at the fold line portion was observed. The distance of the sheets appearing at the fold line portion as a result of peeling of the image was measured. Those having the width of 1.0 mm or less were accepted.

As in the present invention, when the Si content in the aluminum substrate is more than 0.6% by mass, crystals of Si are precipitated, the resistance value of the metal part increases, and heat generation is suppressed. As a result, a toner having a lower glass transition point can be used, and low-temperature fixing can be achieved while maintaining the transferability.

TABLE II

| | | SUPPORT | | TONNER | | | | | |
|---|---|---|---|---|---|---|---|---|---|
| | *1 | SUPPORT NO. | Si CONTENT [% BY MASS] | TONNER NO. | *2 | APEs [% BY MASS] | CPEs [% BY MASS] | St/Ac [% BY MASS] | PRODUCING METHOD |
| EXAMPLE 1 | 1 | 1 | 0.61 | 1 | 25.9 | 73.0 | 22.5 | 4.5 | EMULSION ASSOCIATION |
| EXAMPLE 2 | 2 | 2 | 3 | 1 | 25.9 | 73.0 | 22.5 | 4.5 | EMULSION ASSOCIATION |
| EXAMPLE 3 | 3 | 3 | 19.5 | 1 | 25.9 | 73.0 | 22.5 | 4.5 | EMULSION ASSOCIATION |
| EXAMPLE 4 | 2 | 2 | 3 | 2 | 0.2 | 75.3 | 24.7 | 0.0 | EMULSION ASSOCIATION |
| EXAMPLE 5 | 2 | 2 | 3 | 3 | 39.2 | 78.7 | 21.3 | 0.0 | EMULSION ASSOCIATION |
| EXAMPLE 6 | 2 | 2 | 3 | 4 | 43.5 | 100.0 | 0.0 | 0.0 | PULVERIZATION |
| EXAMPLE 7 | 2 | 2 | 3 | 5 | 28.7 | 10.2 | 11.0 | 78.7 | EMULSION POLYMERIZATION |
| EXAMPLE 8 | 2 | 2 | 3 | 6 | 35.5 | 0.0 | 0.0 | 100.0 | EMULSION POLYMERIZATION |
| EXAMPLE 9 | 4 | 4 | 20.5 | 1 | 25.9 | 73.0 | 22.5 | 4.5 | EMULSION ASSOCIATION |
| COMPARATIVE EXAMPLE 1 | 5 | 5 | 0.5 | 1 | 25.9 | 73.0 | 22.5 | 4.5 | EMULSION ASSOCIATION |
| COMPARATIVE EXAMPLE 2 | 1 | 2 | 3 | 7 | −1.5 | 74.9 | 25.1 | 0.0 | EMULSION ASSOCIATION |
| COMPARATIVE EXAMPLE 3 | 2 | 2 | 3 | 8 | 45.8 | 81.4 | 18.6 | 0.0 | EMULSION ASSOCIATION |
| COMPARATIVE EXAMPLE 4 | 6 | 6 | 0 | 1 | 25.9 | 73.0 | 22.5 | 4.5 | EMULSION ASSOCIATION |

*1: PHOTORECEPTOR NO.
*2: GLASS TRANSITION POINT (Tg) [° C.]

TABLE III

| | TRANSFERABILITY IN HIGH-TEMPERATURE AND HIGH-HUMIDITY ENVIRONMENTS | LOW TEMPERATURE FIXABILITY (NORMAL TEMPERATURE −30° C.) |
|---|---|---|
| EXAMPLE 1 | 1.21 | 0.8 |
| EXAMPLE 2 | 1.27 | 0.5 |
| EXAMPLE 3 | 1.25 | 0.4 |
| EXAMPLE 4 | 1.21 | 0.2 |
| EXAMPLE 5 | 1.31 | 0.7 |
| EXAMPLE 8 | 1.32 | 0.9 |
| EXAMPLE 7 | 1.25 | 0.8 |
| EXAMPLE 8 | 1.25 | 0.9 |
| EXAMPLE 9 | 1.22 | 0.5 |
| COMPARATIVE EXAMPLE 1 | 1.19 | 0.4 |
| COMPARATIVE EXAMPLE 2 | 1.18 | 0 |
| COMPARATIVE EXAMPLE 3 | 1.34 | 1.1 |
| COMPARATIVE EXAMPLE 4 | 1.19 | 0.5 |

As shown in the above results, it is understood that the image forming method of the present invention is better in both transferability and low-temperature fixability than the image forming methods of Comparative Examples.

According to the above-described means of the present invention, an image forming method and an image forming system that can achieve both low-temperature fixability and transferability can be provided.

The expression mechanism or action mechanism of the effect of the present invention is not clear, but it is presumed as follows.

For the photoreceptor elementary tube, wrought aluminum materials of JIS 3003 series and 6063 series are often used. These are multi-element alloys containing silicon (Si), and the Si content of the 3003 series is 0.6% by mass or less, and the Si content of the 6063 series is in a range of 0.4 to 0.8% by mass.

Furthermore, in an aluminum substrate containing silicon, unlike a non-magnetic non-metallic substance, protrusions due to crystal growth are formed on the surface of the aluminum substrate. Here, examples of the non-magnetic non-metallic substance include synthetic resin, rubber, and ceramic.

Formation of the protrusions on the surface of the aluminum substrate can impart appropriate roughness to the surface of the photoreceptor. As a result, the number of contact points between the toner and the photoreceptor can be reduced, and the transferability is further improved.

Note that, as illustrated in FIG. 1, the Al—Si alloy is a eutectic system having a eutectic point at 577° C. and 12.6% Si content, and eutectic solidification occurs when the alloy in a liquid state (L) is cooled. The Si crystal crystallized as a eutectic crystal hardly dissolves Al as a solid solution, and forms protrusions due to crystal growth on the surface of the aluminum substrate.

From the above reasons, since a silicon content of the aluminum substrate of the photoreceptor is more than 0.6% by mass according to the present invention, even when the glass transition point of the toner for developing an electrostatic image is as low as 0 to 45° C., the transferability is not deteriorated. Furthermore, according to the present invention, both low-temperature fixability and transferability can be achieved. Note that when the glass transition point is lower than 0° C., the transferability deteriorates, and when the glass transition point exceeds 45° C., the fixability deteriorates.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-067717 filed on Apr. 18, 2023 is incorporated herein by reference in its entirety.

What is claimed is:

1. An image forming method using a photoreceptor including at least an aluminum substrate, a toner for developing an electrostatic image including toner particles containing at least a binding resin, and a developer bearing member including a member that generates a magnetic flux inside, wherein the aluminum substrate contains silicon, a silicon content of the aluminum substrate is more than 0.6% by mass, and a glass transition point (Tg) of the toner for developing an electrostatic image is in a range of 0 to 45° C.

2. The image forming method according to claim 1, wherein a main component of the binding resin contained in the toner particles is polyester.

3. The image forming method according to claim 1, wherein a silicon content of the aluminum substrate is more than 0.6% by mass and 20% by mass or less.

4. An image forming system comprising:

a photoreceptor including at least an aluminum substrate;

a means that develops a latent image formed on the photoreceptor with a toner for developing an electrostatic image;

a means that transfers a toner image on the photoreceptor to a transfer-receiving body; and the toner for developing an electrostatic image, wherein the aluminum substrate contains silicon, a silicon content of the aluminum substrate is more than 0.6% by mass, and a glass transition point (Tg) of the toner for developing an electrostatic image is in a range of 0 to 45° C.

* * * * *